US012716290B2

(12) United States Patent
McNiel et al.

(10) Patent No.: US 12,716,290 B2
(45) Date of Patent: Aug. 25, 2026

(54) LADDER TAPE ASSEMBLIES WITH CORD SHROUDS ARRANGEMENTS FOR SLATTED BLINDS

(71) Applicant: Hunter Douglas, Inc., New York, NY (US)

(72) Inventors: Claude Mathew McNiel, Gilbert, AZ (US); Gordon Freirich, Temple, AZ (US); Wendell B. Colson, Vineyard Haven, MA (US)

(73) Assignee: Hunter Douglas Inc., New York, NY (US)

( * ) Notice: Subject to any disclaimer, the term of this patent is extended or adjusted under 35 U.S.C. 154(b) by 134 days.

(21) Appl. No.: 18/010,655

(22) PCT Filed: Jun. 4, 2021

(86) PCT No.: PCT/US2021/035903
§ 371 (c)(1),
(2) Date: Dec. 15, 2022

(87) PCT Pub. No.: WO2021/257295
PCT Pub. Date: Dec. 23, 2021

(65) Prior Publication Data

US 2023/0220727 A1 Jul. 13, 2023

Related U.S. Application Data

(60) Provisional application No. 63/040,619, filed on Jun. 18, 2020.

(51) Int. Cl.

| | |
|---|---|
| ***E06B 9/303*** | (2006.01) |
| ***E06B 9/382*** | (2006.01) |
| ***E06B 9/384*** | (2006.01) |

(52) U.S. Cl.
CPC .............. *E06B 9/303* (2013.01); *E06B 9/382* (2013.01); *E06B 9/384* (2013.01)

(58) Field of Classification Search
CPC .......... E06B 9/303; E06B 9/382; E06B 9/384; E06B 9/26; E06B 9/38
See application file for complete search history.

(56) References Cited

U.S. PATENT DOCUMENTS 5,582,226 A 12/1996 Voss et al.
5,613,540 A 3/1997 Jelic
(Continued)

FOREIGN PATENT DOCUMENTS

CA 2 783 860 A1 2/2013
CN 1846576 A 10/2006
(Continued)

OTHER PUBLICATIONS

International Search Report and Written Opinion issued in Application No. PCT/US2021/035903 mailed Nov. 9, 2021 (13 pages).
(Continued)

*Primary Examiner* — Abe Massad
*Assistant Examiner* — Matthew R. Shepherd
(74) *Attorney, Agent, or Firm* — Dority & Manning, P.A.

(57) ABSTRACT

In one aspect, a slatted blind includes a headrail, a bottom rail, and a plurality of horizontally oriented slats configured to be supported between the headrail and the bottom rail via one or more ladder tape assemblies. Each ladder tape assembly includes a first ladder rail, a second ladder rail, and a plurality of ladder steps extending between the first and second ladder rails, with each ladder step being configured to support a respective slat of the plurality of slats of the slatted blind. Additionally, each ladder tape assembly incor-
(Continued)

porates or includes shroud-like features and/or structure for retaining or limiting access to one or more lift cords of the blind.

15 Claims, 12 Drawing Sheets

(56) References Cited

U.S. PATENT DOCUMENTS

| | | | | |
|---|---|---|---|---|
| 6,192,963 | B1 * | 2/2001 | Chen | E06B 9/303 160/168.1 R |
| 6,792,995 | B2 | 9/2004 | Judkins | |
| 6,880,608 | B2 * | 4/2005 | Robinson | E06B 9/382 160/178.3 |
| 8,783,330 | B2 | 7/2014 | Anthony et al. | |
| 10,190,364 | B2 * | 1/2019 | Tachikawa | E06B 9/384 |
| 2003/0127197 | A1 * | 7/2003 | Lai | E06B 9/384 160/115 |
| 2005/0199352 | A1 * | 9/2005 | Lin | E06B 9/384 160/178.3 |
| 2006/0289124 | A1 * | 12/2006 | Tsai | E06B 9/303 160/178.3 |
| 2012/0193043 | A1 | 8/2012 | Bishop et al. | |
| 2013/0048233 | A1 | 2/2013 | Lin | |
| 2017/0152706 | A1 * | 6/2017 | Cha | E06B 9/262 |
| 2021/0017913 | A1 * | 1/2021 | Auriol | F01D 11/24 |

FOREIGN PATENT DOCUMENTS

| | | | |
|---|---|---|---|
| JP | 2013227841 | A | 11/2013 |
| JP | 6059221 | B2 | 1/2017 |
| WO | WO 2011/110544 | A2 | 9/2011 |
| WO | WO 2015/155267 | A1 | 10/2015 |

OTHER PUBLICATIONS

International Preliminary Report on Patentability issued in Application No. PCT/US2021/035903 dated Dec. 13, 2022 (9 pages).

* cited by examiner

LADDER TAPE ASSEMBLIES WITH CORD SHROUDS ARRANGEMENTS FOR SLATTED BLINDS

CROSS-REFERENCE TO RELATED APPLICATIONS

The present application is a national phase application of International Application No. PCT/US2021/035903, filed Jun. 4, 2021, which, in turn, is based upon and claims the right of priority to U.S. Provisional Patent Application No. 63/040,619, filed Jun. 18, 2020, the disclosures of both of which are hereby incorporated by reference herein in their entirety for all purposes.

FIELD

The present subject matter relates generally to window coverings for architectural structures and, more particularly, to a slatted blind, such as a Venetian blind, having ladder tape assemblies that integrate or include shroud-like features and/or structures for retaining or limiting access to the lift cords of the blind.

BACKGROUND

Coverings, such as horizontal/Venetian blinds and other similar slatted blinds, typically include a headrail, a bottom rail, and a plurality of horizontally oriented slats configured to be supported between the headrail and the bottom rail via two or more sets of ladder tapes. Additionally, one or more lift cords typically extend between the headrail and the bottom rail for adjusting the position of the bottom rail relative to the headrail. In many instances, each lift cord passes through a set of aligned route holes defined in the slats. Unfortunately, given their shape and typical dimensions, conventional route holes generally allow for light to pass through a blind when the slats have been tilted to their fully closed position. Additionally, the light gaps defined between the lift cord and the outer perimeter of conventional route holes often allow for a view through the blind when closed, thereby creating privacy concerns for homeowners with such blinds.

To address such light-blocking and privacy concerns, “privacy” Venetian blinds have been developed that eliminate the route holes from the slats and include lift cords that extend along the front and rear sides of the slats to allow the bottom rail to be raised and lowered relative to the headrail. While these blind arrangements provide significantly improved light-blocking and privacy, the altered cording configuration can result in lift cords that are more readily accessible and manipulatable by users of the covering. In today’s market, it is typically desirable to remove any of such accessible cords and/or otherwise provide arrangements for reducing the ability of a user to access the lift cords.

Accordingly, an improved ladder tape assembly for a slatted blind that integrates or includes features and/or structures for shrouding or retaining the blind’s lift cords would be welcomed in the technology.

BRIEF SUMMARY

Aspects and advantages of the present subject matter will be set forth in part in the following description, or may be obvious from the description, or may be learned through practice of the present subject matter.

In one aspect, the present subject matter is directed to a slatted blind including a headrail, a bottom rail movable relative to the headrail, a lift cord extending between the headrail and the bottom rail, and a plurality of slats disposed between the headrail and the bottom rail. The slatted blind also includes a ladder tape assembly configured to support the plurality of slats between the headrail and the bottom rail. The ladder tape assembly includes a first vertically extending ladder rail, a second vertically extending ladder rail spaced apart from the first ladder rail, and a plurality of ladder steps extending between the first and second ladder rails, with each ladder step being configured to support a respective slat of the plurality of slats. In addition, the first ladder rail is configured as a cord ladder including a plurality of transversely extending crosswise cords. The cord ladder includes a plurality of shroud sections spaced apart vertically along the length of the first ladder rail, with each shroud section of the plurality of shroud sections being formed by a grouping of crosswise cords corresponding to a subset of the plurality of crosswise cords. The lift cord is configured to be woven through the cord ladder along a length of the first ladder rail in an alternating manner between opposed sides of the first ladder rail.

In another aspect, the present subject matter is directed to a ladder tape assembly for supporting slats of a slatted blind. The ladder tape assembly includes a first vertically extending ladder rail, a second vertically extending ladder rail spaced apart from the first ladder rail, and a plurality of ladder steps extending between the first and second ladder rails, with each ladder step being configured to support a respective slat of a plurality of slats. Additionally, the first ladder rail includes an inner rail cord, an outer rail cord spaced apart from the inner rail cord, and a plurality of crosswise cords extending between the inner and outer rail cords to form a cord ladder. The cord ladder includes a plurality of shroud sections spaced apart vertically along the length of the first ladder rail, with each shroud section of the plurality of shroud sections being formed by a grouping of crosswise cords corresponding to a subset of the plurality of crosswise cords.

In a further aspect, the present subject matter is directed to a slatted blind including a headrail, a bottom rail movable relative to the headrail, a lift cord extending between the headrail and the bottom rail, and a plurality of slats disposed between the headrail and the bottom rail. The slatted blind also includes a ladder tape assembly configured to support the plurality of slats between the headrail and the bottom rail. The ladder tape assembly includes a first vertically extending ladder rail, a second vertically extending ladder rail spaced apart from the first ladder rail, and a plurality of ladder steps extending between the first and second ladder rails, with each ladder step being configured to support a respective slat of the plurality of slats. In addition, the first ladder rail includes a first vertical run, a second vertical run spaced apart from the first vertical run, and a plurality of connector arms extending between and connecting the first and second vertical runs to form a cord shroud, with the lift cord extending vertically through the cord shroud. The plurality of connector arms include a first subset of vertically spaced connector arms and a second subset of vertically spaced connector arms, with the first subset of connector arms extending between the first and second vertical runs along a first side of the cord shroud and the second subset of connector arms extending between the first and second vertical runs along an opposed second side of the cord shroud. Additionally, the cord shroud covers at least 25% of an outer surface area of the lift cord.

In yet another aspect, the present subject matter is directed to a ladder tape assembly for supporting slats of a slatted blind. The ladder tape assembly includes a first vertically extending ladder rail, a second vertically extending ladder rail spaced apart from the first ladder rail, and a plurality of ladder steps extending between the first and second ladder rails, with each ladder step being configured to support a respective slat of a plurality of slats. The first ladder rail including an inner vertical run, an outer vertical run spaced apart from the inner vertical run, and a plurality of crosswise cords extending between the inner and outer vertical runs so as to form a cord shroud configured to receive a lift cord. Additionally, the plurality of connector arms comprises a first subset of vertically spaced connector arms and a second subset of vertically spaced connector arms, with the first subset of connector arms extending between the inner and outer vertical runs along a first side of the cord shroud and the second subset of connector arms extending between the inner and outer vertical runs along an opposed second side of the cord shroud. Additionally, the cord shroud is configured covers at least 25% of an outer surface area of a lift cord extended therethrough.

In an even further aspect, the present subject matter is directed to a slatted blind including a headrail, a bottom rail movable relative to the headrail, first and second lift cords extending between the headrail and the bottom rail, and a plurality of slats disposed between the headrail and the bottom rail. The slatted blind also includes a ladder tape assembly configured to support the plurality of slats between the headrail and the bottom rail. The ladder tape assembly includes a first vertically extending ladder rail, a second vertically extending ladder rail spaced apart from the first ladder rail, and a plurality of ladder steps extending between the first and second ladder rails, with each ladder step being configured to support a respective slat of the plurality of slats. In addition, each ladder step is configured to form first and second shroud loops disposed between the first and second ladder rails, with the first lift cord extending vertically through the first shroud loops formed by the plurality of ladder steps and the second lift cord extending vertically through the second shroud loops formed by the plurality of ladder steps.

In another aspect, the present subject matter is directed to a ladder tape assembly for supporting slats of a slatted blind. The ladder tape assembly includes a first vertically extending ladder rail, a second vertically extending ladder rail spaced apart from the first ladder rail, and a plurality of ladder steps extending between the first and second ladder rails, with each ladder step being configured to support a respective slat of a plurality of slats. Additionally, each ladder step is configured to form first and second shroud loops disposed between the first and second ladder rails, with the first shroud loop of each ladder step being configured to receive a first lift cord therethrough and the second shroud loop of each ladder step being configured to receive a second lift cord therethrough.

In a further aspect, the present subject matter is directed to a slatted blind including a headrail, a bottom rail movable relative to the headrail, first and second lift cords extending between the headrail and the bottom rail, and a plurality of slats disposed between the headrail and the bottom rail. The slatted blind also includes a ladder tape assembly configured to support the plurality of slats between the headrail and the bottom rail. The ladder tape assembly includes a first vertically extending ladder rail, a second vertically extending ladder rail spaced apart from the first ladder rail, and a plurality of ladder steps extending between the first and second ladder rails, with each ladder step being configured to support a respective slat of the plurality of slats. In addition, the ladder tape assembly includes first and second tubular shrouds coupled to the first and second ladder rails, respectively, with the first and second lift cords extending through the first and second shrouds, respectively, between the headrail and the bottom rail.

In another aspect, the present subject matter is directed to a ladder tape assembly for supporting slats of a slatted blind. The ladder tape assembly includes a first vertically extending ladder rail and a second vertically extending ladder rail spaced apart from the first ladder rail, with the first ladder rail including a first rail cord and the second ladder rail including a second rail cord. The ladder tape assembly also includes a plurality of ladder steps extending directly between the first and second rail cords, with each ladder step being configured to support a respective slat of a plurality of slats. Additionally, the ladder tape assembly includes first and second tubular shrouds coupled to the first and second rail cords, respectively, with each of the first and second shrouds being configured to encase a respective lift cord.

In yet another aspect, the present subject matter is directed to a slatted blind including a headrail, a bottom rail movable relative to the headrail, a lift cord extending between the headrail and the bottom rail, and a plurality of slats disposed between the headrail and the bottom rail. The slatted blind also includes a ladder tape assembly configured to support the plurality of slats between the headrail and the bottom rail. The ladder tape assembly includes a first vertically extending ladder rail, a second vertically extending ladder rail spaced apart from the first ladder rail, and a plurality of ladder steps extending between the first and second ladder rails, with each ladder step being configured to support a respective slat of the plurality of slats. In addition, the ladder tape assembly includes a tubular shroud coupled to the first ladder rail in a continuous or substantially continuous manner along a length of the first ladder rail, with the lift cord extending through the shroud between the headrail and the bottom rail.

In a further aspect, the present subject matter is directed to a ladder tape assembly for supporting slats of a slatted blind. The ladder tape assembly includes a first vertically extending ladder rail and a second vertically extending ladder rail spaced apart from the first ladder rail, with the first ladder rail including a first rail cord and the second ladder rail including a second rail cord. The ladder tape assembly also includes a plurality of ladder steps extending directly between the first and second rail cords, with each ladder step being configured to support a respective slat of a plurality of slats. Additionally, the ladder tape assembly includes a tubular shroud coupled to the first rail cord in a continuous or substantially continuous manner along a length of the first rail cord, with the shroud being configured to encase a respective lift cord.

These and other features, aspects, and advantages of the present subject matter will become better understood with reference to the following Detailed Description and appended claims. The accompanying drawings, which are incorporated in and constitute a part of this specification, illustrate embodiments of the present subject matter and, together with the description, serve to explain the principles of the present subject matter.

This Brief Description is provided to introduce a selection of concepts in a simplified form that are further described below in the Detailed Description. This Brief Description is not intended to identify key features or essential features of the claimed subject matter, nor is it intended as an aid in determining the scope of the claimed subject matter.

BRIEF DESCRIPTION OF THE DRAWINGS

A full and enabling disclosure of the present subject matter, including the best mode thereof, directed to one of ordinary skill in the art, is set forth in the specification, which makes reference to the appended figures, in which.

DETAILED DESCRIPTION

Figure 1:
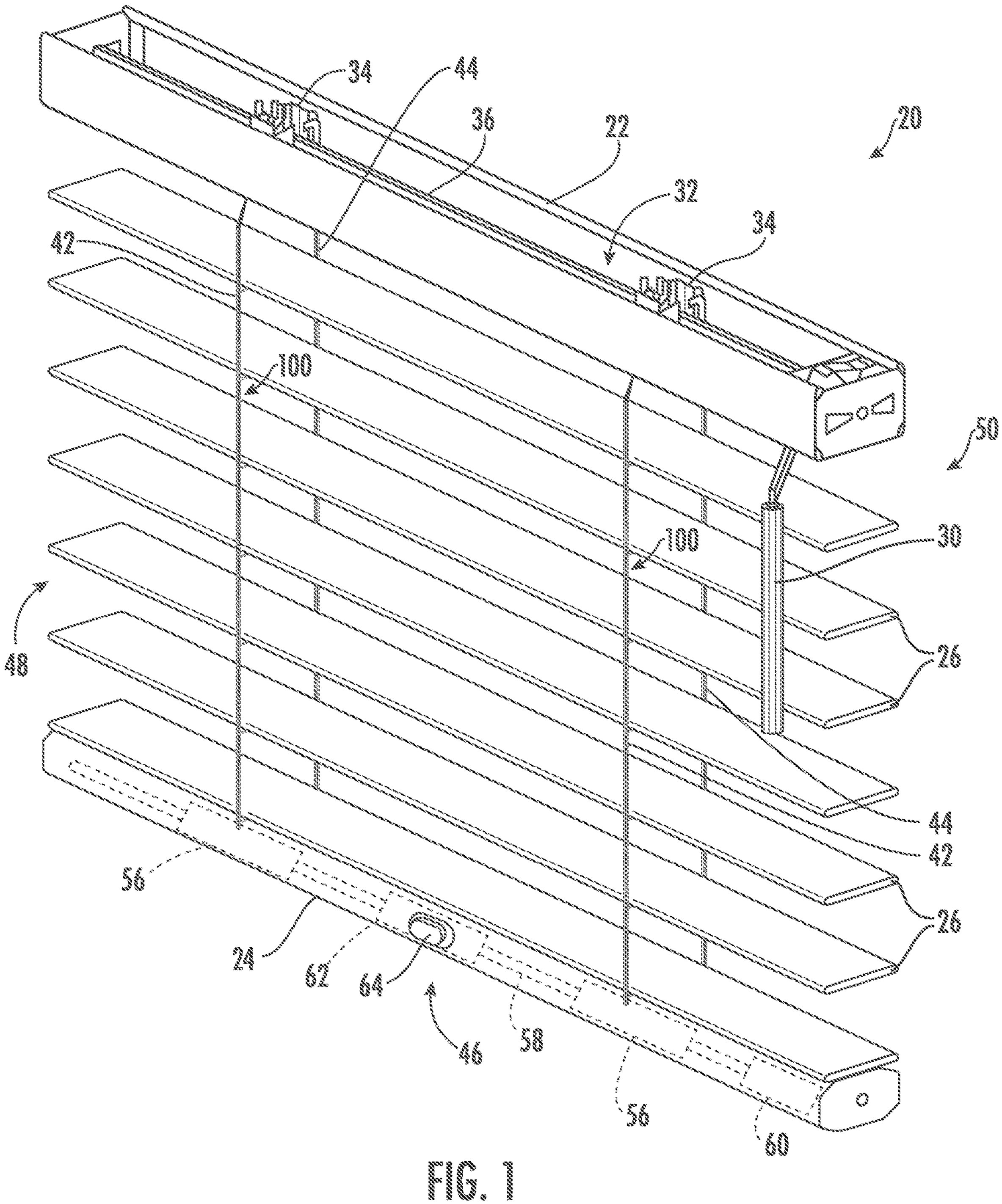
FIG. 1 illustrates a perspective view of one embodiment of a covering for an architectural structure, particularly illustrating the covering configured as a slatted blind in which the disclosed ladder tape assemblies may be used in accordance with aspects of the present subject matter.

In general, the present subject matter is directed to a covering for an architectural feature or structure (referred to herein simply as an architectural "structure" for the sake of convenience and without intent to limit). In several embodiments, the covering is configured as a slatted blind (e.g., a Venetian blind) including a headrail, a bottom rail, and a plurality of horizontally oriented slats configured to be supported between the headrail and the bottom rail via one or more ladder tape assemblies. Each ladder tape assembly includes a first ladder rail, a second ladder rail, and a plurality of ladder steps extending between the first and second ladder rails, with each ladder step being configured to support a respective slat of the plurality of slats of the slatted blind.

Additionally, in accordance with aspects of the present subject matter, each ladder tape assembly incorporates or includes shroud-like features and/or structures for retaining or limiting access to one or more lift cords of the blind. For instance, in one embodiment, the blind includes a pair of lift cords extending between the headrail and the bottom rail at the location of each ladder tape assembly. In such an embodiment, each ladder tape assembly may incorporate or include shroud-like features and/or structure for retaining or limiting access to one or both of the lift cords.

In one aspect of the present subject matter, each ladder rail of a given ladder tape assembly is configured as a cord ladder through which a corresponding lift cord can be woven in an alternating manner between opposed sides of the cord ladder to retain the lift cord relative to the ladder rail. For instance, in one embodiment, each ladder rail includes an inner rail cord, an outer rail cord spaced apart from the inner rail cord, and a plurality of crosswise cords extending transversely between the inner and outer rail cords. In such an embodiment, the crosswise cords are spaced apart vertically from one another along a length of the ladder rail to form a ladder-like construction, thereby allowing a lift cord to be woven through gaps defined between the crosswise cords.

In one embodiment, subsets of the crosswise cords of each ladder rail are grouped closely together to form a plurality of shroud sections spaced apart vertically from one another along the length of the ladder rail. In such an embodiment, a lift cord can be woven between the crosswise cords of the cord ladder by weaving such lift cord through the longitudinal gaps defined between adjacent shroud sections in an alternating manner between opposed sides of the cord ladder. In addition, or as an alternative thereto, a lift cord can be woven between the crosswise cords of the cord ladder by weaving such lift cord through the gaps defined between adjacent crosswise cords of each shroud section in an alternating manner between opposed sides of the cord ladder.

In another embodiment, the crosswise cords of each ladder rail are substantially uniformly spaced apart from one another along the length of the ladder rail. In such an embodiment, a lift cord can be woven between the crosswise cords of the cord ladder by weaving such lift cord through the gaps defined between each successive adjacent pair of substantially uniformly spaced crosswise cords or through gaps defined between groups of substantially uniformly spaced crosswise cords.

In a further aspect of the present subject matter, each ladder rail of a given ladder tape assembly is configured as a cord shroud configured to at least partially encompass or encase a lift cord of the blind. For instance, in one embodiment, each cord shroud is configured to have a tubular-like construction through which its respective lift cord extends to limit user access to all or a portion of such lift cord along the length of the ladder rail.

In one embodiment, each tubular-like shroud includes a pair of vertically extending runs (e.g., inner and outer vertical runs) and a plurality of connector arms extending between and connecting the inner and outer vertical runs. In one embodiment, the connecter arms are divided into a first subset of vertically spaced connector arms and a second subset of vertically spaced connecter arms, with the first subset of connecter arms extending between the inner and outer vertical runs so as to form a first side of the cord shroud and the second subset of connector arms extending between the inner and outer vertical runs so as to form an opposed second side of the cord shroud. In such an embodiment, the first and second subset of connecter arms may be spaced apart horizontally from each other such that an interior passageway is defined between the opposed subsets of connecter arms through which the lift cord is configured to extend.

Additionally, in several embodiments, each cord shroud is formed as an integral or continuously knitted construction. For instance, in one embodiment, each cord shroud corresponds to a knitted assembly in which the inner and outer vertical runs are formed by two or more yarns knitted together, with the plurality of connector arms corresponding to cross-stiches spanning between the inner and outer vertical runs.

In yet another aspect of the present subject matter, each ladder step of a given ladder tape assembly is configured to form a pair shroud loops between the first and second ladder rails of the ladder tape assembly, with each shroud loop being configured to receive a respective lift cord of the associated blind. For instance, each ladder step may form both a first shroud loop configured to receive a first lift cord of the blind and a second shroud loop configured to receive a second lift cord of the blind. In such an embodiment, the first and second lift cords are configured to extend vertically though the first and second shroud loops, respectively, formed by the various ladder steps of the ladder tape assembly.

In one embodiment, each ladder step includes first and second rung cords extending between the first and second ladder rails of the ladder tape assembly, with the separate rung cords being coupled together at a connection point defined between the first and second ladder rails. In such an embodiment, the first shroud loop is formed by the first and second rung cords between the first ladder rail and the connection point, and the second shroud loop is formed by the first and second rung cords between the second ladder rail and the connection point. In one embodiment, the first and second cord rungs are coupled together at the connection point via a fastener(s).

In another embodiment, each ladder step includes a single rung cord extending between the first and second ladder rails of the ladder tape assembly. In such an embodiment, the first and second shroud loops are formed by first and second openings, respectively, defined in the single rung cord between the first and second ladder rails.

In a further aspect, a separate shroud is coupled to one or both of the ladder rails of a ladder tape assembly and is configured to receive a lift cord of the associated blind. In one embodiment, each shroud is coupled to its respective ladder rail in a continuous or substantially continuous manner along the length of such rail. Alternatively, each shroud may be coupled to its respective ladder rail in a non-continuous manner, such as by coupling the shroud to its respective ladder rail at significantly spaced apart intervals along the length of such rail.

It should be understood that, as described herein, an "embodiment" (such as illustrated in the accompanying Figures) may refer to an illustrative representation of an environment or article or component in which a disclosed concept or feature may be provided or embodied, or to the representation of a manner in which just the concept or feature may be provided or embodied. However, such illustrated embodiments are to be understood as examples (unless otherwise stated), and other manners of embodying the described concepts or features, such as may be understood by one of ordinary skill in the art upon learning the concepts or features from the present disclosure, are within the scope of the disclosure. In addition, it will be appreciated that while the Figures may show one or more embodiments of concepts or features together in a single embodiment of an environment, article, or component incorporating such concepts or features, such concepts or features are to be understood (unless otherwise specified) as independent of and separate from one another and are shown together for the sake of convenience and without intent to limit to being present or used together. For instance, features illustrated or described as part of one embodiment can be used separately, or with another embodiment to yield a still further embodiment. Thus, it is intended that the present subject matter covers such modifications and variations as come within the scope of the appended claims and their equivalents.

Referring now to the drawings, FIG. 1 illustrates a perspective view of one embodiment of a covering 20 for an architectural structure (not shown) in accordance with aspects of the present subject matter. In general, the covering 20 is configured to be installed relative to a window, door, or any other suitable architectural structure as may be desired. In one embodiment, the covering 20 may be configured to be mounted relative to an architectural structure to allow the covering 20 to be suspended or supported relative to the architectural structure. It should be understood that the covering 20 is not limited in its particular use as a window or door shade, and may be used in any application as a covering, partition, shade, and/or the like, relative to and/or within any type of architectural structure.

In several embodiments, the covering 20 may be configured as a slatted blind, such as a "privacy" Venetian-blind-type extendable/retractable covering. For example, in the embodiment shown in FIG. 1, the blind 20 includes a headrail 22, a bottom rail 24, and one or more covering elements extending between the headrail 22 and the bottom rail 24, such as a plurality of horizontally disposed parallel slats 26 configured to be supported between the headrail 22 and the bottom rail 24 via one or more ladder tape assemblies 100 (e.g., a pair of ladder tape assemblies 100). As is generally understood, the slats 26 are rotatable or tiltable about their longitudinal axes by manipulating the ladder tape assemblies 100 to allow the slats 26 to be tilted between a horizontal or open position (e.g., as shown in FIG. 1) for permitting light to pass between the slats 26 and a closed position (not shown), wherein the slats 26 are substantially vertically oriented in an overlapping manner to occlude or block the passage of light through the blind 20. It should be appreciated that the ladder tape assemblies 100 may be manipulated to allow for the slats 26 to be tilted between their open and closed positions using, for example, a suitable tilt wand 30 or any other suitable control device forming part of a tilt system 32 provided in operative association with the blind 20. For example, as shown in FIG. 1, the blind 20 includes one or more components of the tilt system 32 within the headrail 22, such as a tilt station 34 provided in operative association with each ladder tape assembly 100 and a tilt rod 36 coupled between the tilt wand 30 and the tilt stations 34. In such an embodiment, as the tilt wand 30 is manipulated by the user (e.g., by rotating the tilt wand 30 relative to the headrail 22), the tilt rod 36 may be rotated to rotationally drive one or more tilt drums (not shown) of the tilt stations 34, thereby allowing front and rear ladder rails (not shown) of each ladder tape assembly 100 to be raised or lowered relative to each other to adjust the tilt angle of the slats 26. It should be appreciated that each tilt station 34 may generally have any suitable configuration, including any conventional tilt station configuration and/or any other suitable configuration that allows the tilt stations 34 to function as described herein.

Moreover, as shown FIG. 1, the blind 20 also includes one or more pairs of lift cords 42, 44 forming part of a lift system 46 for moving the blind 20 between a lowered or extended position (e.g., as shown in FIG. 1) and a raised or retracted position (not shown). In the illustrated embodiment, the blind 20 includes two pairs of lift cords 42, 44 extending between the headrail 22 and the bottom rail 24. Each lift cord pair in FIG. 1 includes a front lift cord 42 extending along a front side 48 of the blind 20, and a rear lift cord 44 extending along a rear side 50 of the blind 20. Specifically, each front lift cord 42 is configured to extend between the headrail 22 and the bottom rail 24 along a front edge 52 (FIG. 3) of each slat 26, while each rear lift cord 44 is configured to extend between the headrail 22 and the bottom rail 24 along an opposed rear edge 54 (FIG. 3) of each slat 26. Additionally, as will be described below, one or both of the lift cords 42, 44 may be operatively coupled to or otherwise provided in operative association with one or more embodiments of the disclosed ladder tape assemblies to facilitate at least partially shrouding or limiting access to such cord(s) 42, 44.

It should be appreciated that, in other embodiments, the blind 20 may only include a front lift cord 42 or a rear lift cord 44 at the locations of the lift cord pairs shown in FIG. 1. For example, in one embodiment, the blind 20 may include a front lift cord 42 extending between the headrail 22 and the bottom rail 24 along the front edge 52 (FIG. 3) of each slat 26 at the location of one of the ladder tape assemblies 100 and a rear lift cord 44 extending between the headrail 22 and the bottom rail 24 along the rear edge 54 (FIG. 3) of each slat 26 at the location of the other ladder tape assembly 100.

In one embodiment, each pair of lift cords 42, 44 may be configured to extend to a corresponding lift station 56 to control the vertical positioning of the bottom rail 24 relative to the headrail 22. For instance, in the illustrated embodiment, each pair of lift cords 42, 44 is operatively coupled to a lift station 56 housed within the bottom rail 24. In such an embodiment, a bottom end (not shown) of each lift cord 42, 44 is configured to be coupled to its associated lift station 56 while an opposed end (not shown) of each lift cord 42, 44 is configured to be coupled to the headrail 22. For example, each lift station 56 may include one or more lift spools (e.g., a pair of lift spools) for winding and unwinding the respective lift cords 42, 44 of each pair of lift cords. Thus, as the bottom rail 24 is raised relative to the headrail 22, each lift cord 42, 44 is wound around its respective lift spool. Similarly, as the bottom rail 24 is lowered relative to the headrail 22, each lift cord 42, 44 is unwound from its respective lift spool. Additionally, the lift system 46 of the blind 20 may also include a lift rod 58 operatively coupled to the lift stations 56 and a spring motor 60 operatively coupled to the lift rod 58. In such an embodiment, as is generally understood, the spring motor 60 may be configured to store energy as the bottom rail 24 is lowered relative to the headrail 22 and release such energy when the bottom rail 24 is being raised relative to the headrail 22 to assist in moving the blind 20 to its retracted position.

It should be appreciated that, in one embodiment, the spring motor 60 may be overpowered. In such an embodiment, to prevent unintended motion of the bottom rail 24 relative to the headrail 22, a brake assembly 62 may be provided within the bottom rail 24 and may be operatively coupled to the lift rod 58 to stop rotation of the lift rod 58. For instance, as shown in FIG. 1, to actuate the brake assembly 62, an actuator button 64 is coupled to the bottom rail 24 that can be depressed to release or disengage the brake assembly 62 from the lift rod 58, thereby allowing the lift rod 58 to be rotated in a manner that permits the lift cords 42, 44 to be wound around or unwound from their respective lift spools as the bottom rail 24 is lowered or raised, respectively, relative to the headrail 22. In other embodiments, the spring motor 60 may not be overpowered, thereby eliminating the need for the brake assembly 62. For example, in one embodiment, the spring motor 60 may be adapted to provide a variable torque, thereby allowing the lift system 46 to be configured as a balanced operating system.

It should be appreciated that the configuration of the blind 20 described above and shown in FIG. 1 is provided only to place the present subject matter in an exemplary field of use. Thus, it should be apparent that the present subject matter may be readily adaptable to any suitable manner of covering configuration.

Figure 2:
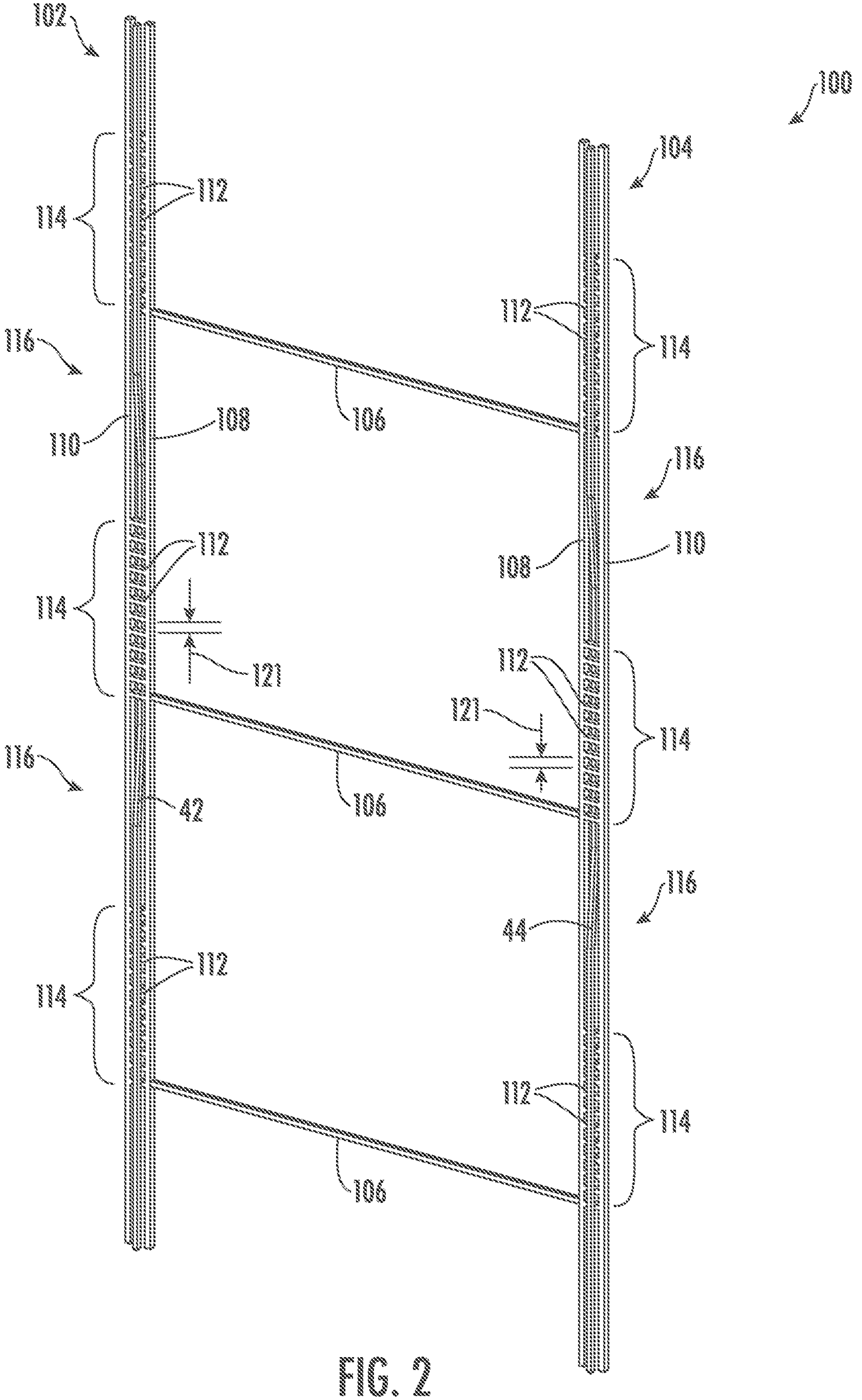
FIG. 2 illustrates a perspective view of one embodiment of a ladder tape assembly suitable for use within a slatted blind in accordance with aspects of the present subject matter, particularly illustrating front and rear ladder rails of the ladder tape assembly being configured as cord ladders incorporating spaced apart shroud sections for retaining the front and rear lift cords of the blind.
Figure 3:
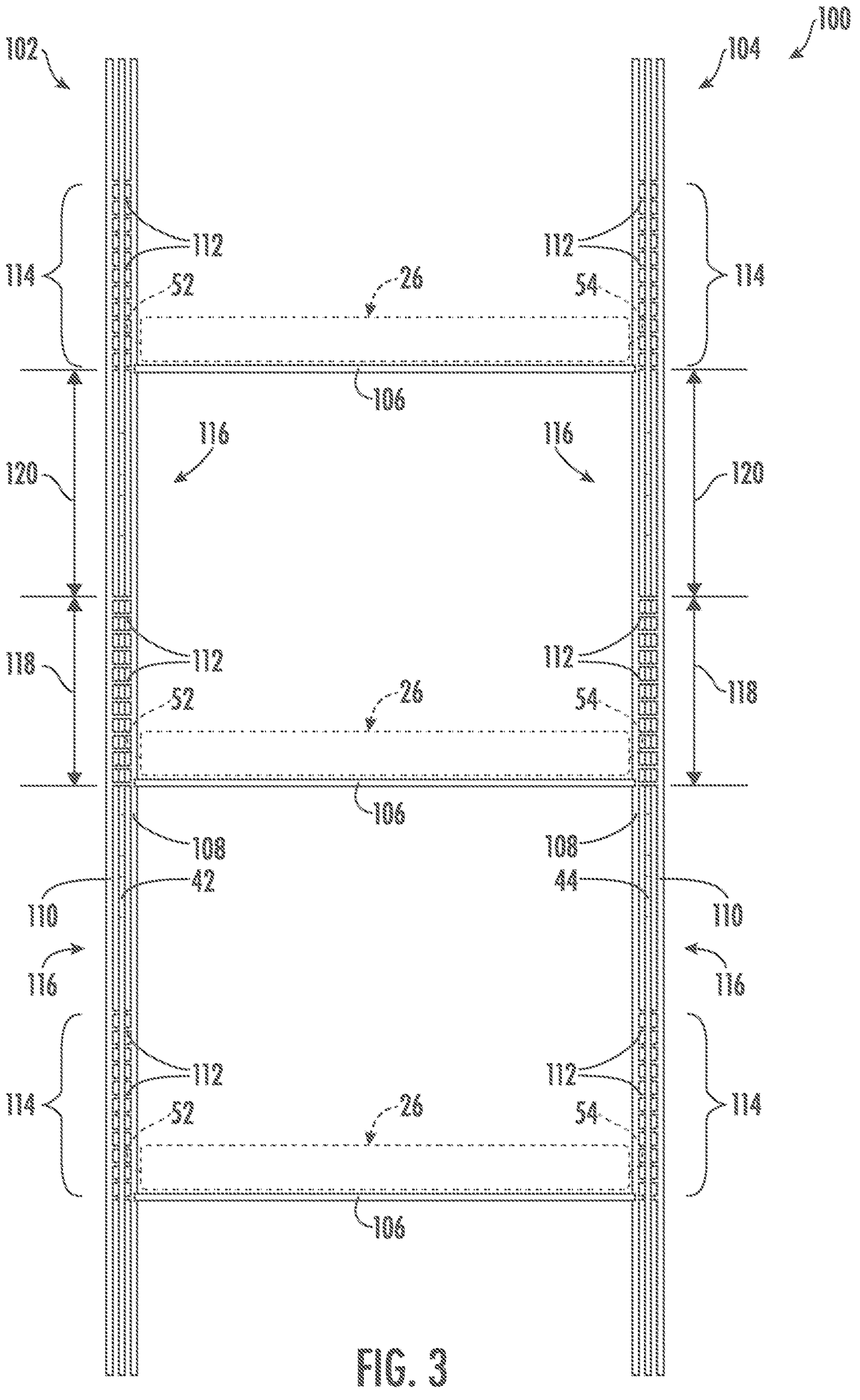
FIG. 3 illustrates a side view of the ladder tape assembly shown in FIG. 2 with slats being supported on the vertically spaced ladder steps of the ladder tape assembly.

Referring now to FIGS. 2 and 3, differing views of one embodiment of a ladder tape assembly 100 suitable for use within a slatted blind are illustrated in accordance with aspects of the present subject matter. Specifically, FIG. 2 illustrates a perspective view of the ladder tape assembly 100 and FIG. 3 illustrates a side view of the ladder tape assembly 100 with slats 26 (shown in dashed lines) supported thereon. It should be appreciated that, for purposes of description, the ladder tape assembly 100 shown in FIGS. 2 and 3 will generally be described with reference to the blind 20 of FIG. 1. However, one of ordinary skill in the art will readily appreciate that the disclosed ladder tape assembly 100 may be used within any other suitable slatted blind have any other suitable configuration.

As shown in the illustrated embodiment, the ladder tape assembly 100 includes a first or front ladder rail 102, a second or rear ladder rail 104, and a plurality of ladder rungs or steps 106 extending between the front and rear ladder rails 102, 104. In general, the front ladder rail 102 is configured to extend vertically along the front side 48 (FIG. 1) of the associated blind 20 such that the front ladder rail 102 is positioned adjacent to the front edges 52 (FIG. 3) of the slats 26 supported by the ladder tape assembly 100, while the rear ladder rail 104 is configured to extend vertically along the rear side 50 (FIG. 1) of the associated blind 20 such that the rear ladder rail 104 is positioned adjacent to the rear edges 54 (FIG. 3) of the slats 26 supported by the ladder tape assembly 100. Additionally, as shown in FIGS. 2 and 3, the various ladder steps 106 are disposed at vertically spaced locations such that each slat 26 is configured to be vertically supported between the front and rear ladder rails 102, 104 by a respective ladder step 106 at a given slat spacing from neighboring or adjacent slats 26 when the blind 20 is at its opened position. In this regard, the ladder tape assembly 100 may generally be configured to function the same as or similar to a conventional ladder tape with reference to supporting/tilting the slats 26. Specifically, the ladder tape assembly 100 may be configured to support the slats 26 of the associated blind 20 for tilting about their respective tilt axes, thereby allowing the blind 20 to be transitioned between an opened position or state, at which the slats 26 are supported by the ladder tape assembly 100 in a horizontal orientation, and a closed position or state, at which the slats 26 are supported by the ladder tape assembly 100 at a substantially vertically orientation. To achieve such tilting of the slats 26, it should be appreciated that the ladder tape assembly 100 may be configured to be provided in operative association with one or more components of the tilt system 32 of the associated blind 20, such as by coupling all or a portion of the ladder rails 102, 104 of each ladder tape assembly 100 to the tilt drum(s) of a respective tilt station 34 to allow the front and rear ladder rails 102, 104 to be raised/lowered relative to each other to adjust the tilt angle of the slats 26.

Moreover, in accordance with aspects of the present subject matter, the ladder tape assembly 100 may also function to at least partially shroud or limit access to one or both of the lift cords 42, 44 of the blind 20. Specifically, in addition to functioning as front and rear tilt cords for the ladder tape assembly 100, the front and rear ladder rails 102, 104 may also be configured to capture or retain portions of the front and rear lift cords 42, 44, respectively. For instance, in several embodiments, each ladder rail 102, 104 may be configured to have an open-structured, ladder-like construction forming a cord ladder including vertically spaced, transverse cords or shroud sections through which the respective lift cord 42, 44 can be woven back-and-forth in an alternating manner to prevent such lift cord 42, 44 from being separated from the ladder rail 102, 104 and formed into a large loop.

In several embodiments, each ladder rail 102, 104 may include a plurality of cords assembled together or otherwise manufactured so as to have the desired open-structured configuration, such as by configuring the cords to form a cord ladder through which the corresponding lift cord 42, 44 may be slidably woven. For example, as shown in FIGS. 2 and 3, each ladder rail 102, 104 includes a pair of flexible, vertically extending rail cords (e.g., an inner rail cord 108 and an outer rail cord 110) connected to each other by a plurality of transversely extending crosswise cords 112. For example, the inner and outer rail cords 108, 110 of each ladder rail 102, 104 may be configured to extend vertically in a parallel, side-by-side arrangement with a small horizontal gap defined therebetween, with the crosswise cords 112 bridging the gap to connect the rail cords 108, 110 to each other. As particularly shown in FIG. 3, each inner rail cord 108 of the front and rear ladder rails 102, 104 may be configured to be extend proximal to the adjacent front and rear edges 52, 54, respectively, of the slats 26, with the inner rail cords 108 being connected or coupled together via the transversely extending ladder steps 106 of the ladder tape assembly 100.

It should be appreciated that, in several embodiments, each ladder rail 102, 104 may be formed as a continuous or integral construction, such as by forming the various cords 108, 110, 112 of each ladder rail 102, 104 from two or more yarns knitted together via a continuous knitting process. Additionally, in one embodiment, the entire ladder tape assembly 100 (including the front and rear ladder rails 102, 104 and the associated ladder steps 106) may be formed as an integral knitted construction in which a plurality of yarns are woven together to form the desired ladder/shroud configuration. Alternatively, one or more of the various components or sub-components of the ladder tape assembly 100 may be formed separately and subsequently assembled together to form the final assembly.

As shown in FIGS. 2 and 3, in several embodiments, the relative positioning of the various crosswise cords 112 of each ladder rail 102, 104 may be selected so as to form a plurality of transverse shroud sections 114 spaced apart vertically along the length of the ladder rail 102, 104, with each shroud section 114 including a plurality of closely grouped crosswise cords 112 forming a subset of the overall number of crosswise cords 112 extending between the rail cords 108, 110. In such an embodiment, the vertical spacing 120 (FIG. 3) defined between the adjacent shroud sections 114 of each ladder rail 102, 104 forms longitudinal gaps 116 that allow the lift cords 42, 44 to be easily woven-back-and forth around the various shroud sections 114. Specifically, each lift cord 42, 44 may be slidably woven back-and-forth through the longitudinal gaps 116 in an alternating manner around the shroud sections 114 of its respective ladder rail 102, 104 to retain or capture the lift cord 42, 44 within such ladder rail 102, 104. For instance, as shown in the illustrated embodiment, each lift cord 42, 44 is slidably woven through the cord ladder formed by its respective ladder rail 102, 104 such that the lift cord 42, 44 extends vertically across a given shroud section 114 along a first side of the ladder rail 102, 104, passes through the adjacent longitudinal gap 116 defined immediately above such shroud section 114 from the first side of the ladder rail 102, 104 to an opposed second side of the ladder rail 102, 104, and then extends vertically across the immediately adjacent shroud section 114 along the second side of the ladder rail 102, 104 before passing through the next adjacent longitudinal gap 116 from the second side of the ladder rail 102, 104 back to the first side of the ladder rail 102, 104, with such pattern being repeated along the length of the ladder rail 102, 104. This alternating, back-and-forth weave pattern serves to confine the lift cord 42, 44 within its respective ladder rail 102, 104, thereby preventing the lift cord 42, 44 from be pulled away or separated from the ladder rail 102, 104 in a manner that would allow the lift cord 42, 44 to be formed into a large loop.

It should be appreciated that the vertical spacing between adjacent or neighboring crosswise cords 112 of each shroud section 114 may be relatively small so as to form discrete shroud sections 114 with tightly spaced crosswise cords 112 along the length of the rails 102, 104. Specifically, in one embodiment, a cord-to-cord spacing distance 121 (FIG. 2) defined between adjacent crosswise cords 112 forming each shroud section 114 may be substantially smaller than the vertical spacing 120 defined between adjacent shroud sections 114. For instance, in one embodiment, a ratio of the vertical spacing distance 120 to the cord-to-cord spacing distance 121 is at least 2:1, such as at least 3:1, or at least 4:1 or at least 5:1, or at least 6:1. Additionally, in the illustrated embodiment, the crosswise cords 112 forming each shroud section 114 are substantially unfirmly spaced apart from one another so that the cord-to-cord spacing distance 121 is substantially constant along a length of each shroud section 114. However, in other embodiments, the crosswise cords 112 forming each shroud section 114 may have variable or non-uniform spacing.

It should also be appreciated that, as an alternative to the weave pattern shown in the illustrated embodiment, each lift cord 42, 44 may be woven through its respective ladder rail 102, 104 in any other suitable manner. For instance, as opposed to weaving each lift cord 42, 44 back-and-forth through the longitudinal gaps 116 defined between adjacent shroud sections 114, each lift cord 42, 44 may, instead, be slidably woven back-and-forth one or more times through each individual shroud section 114. Specifically, in one embodiment, each lift cord 42, 44 may be slidably woven back-and-forth through the small gaps defined between adjacent crosswise cords 112 of each shroud section 114, such as by weaving the lift cord 42, 44 back-and-forth in an alternating manner around each successive crosswise cord 112 of a given shroud section 114 or by weaving the lift cord 42, 44 back-and-forth in an alternating manner around one or more groups of crosswise cords 112 of a given shroud section 114 (e.g., by skipping one or more crosswise cords 112 before weaving the lift cord 42, 44 through the shroud section 114 to the opposed side of the ladder rail 102, 104).

It should also be appreciated that, in general, the vertical height 118 (FIG. 3) of each shroud section 114 and/or the vertical spacing 120 between adjacent shroud sections 114 (e.g., as defined across the longitudinal gap 116) may be varied as desired. For instance, in the illustrated embodiment, the vertical height 118 of each shroud section 114 is approximately equal to the vertical spacing 120 defined between adjacent shroud sections 114 such that the vertical height/spacing ratio across the shroud sections/gaps of each ladder rail 102, 104 is approximately 1:1. In alternative embodiments, the ratio of the vertical height/spacing may correspond to any other suitable ratio. For instance, in one embodiment, the vertical height 118 of each shroud section 114 may be significantly greater than the vertical spacing 120 defined between adjacent shroud sections 114 such that only small longitudinal gaps 116 are defined along the length of each ladder rail 102, 104. In such an embodiment, each ladder rail 102, 104 may, for example, have a vertical height/spacing ratio of at least about 2:1, such as a vertical height/spacing ratio of about 3:1 or about 4:1 or about 5:1. In another embodiment, the vertical height 118 of each shroud section 114 may be significantly smaller than the vertical spacing 120 defined between adjacent shroud sections 114 such that large longitudinal gaps 116 are defined along the length of each ladder rail 102, 104. In such an embodiment, each ladder rail 102, 104 may, for example, have a vertical height/spacing ratio of at least about 1:2, such as a vertical height/spacing ratio of about 1:3 or about 1:4 or about 1:5.

Figure 4:
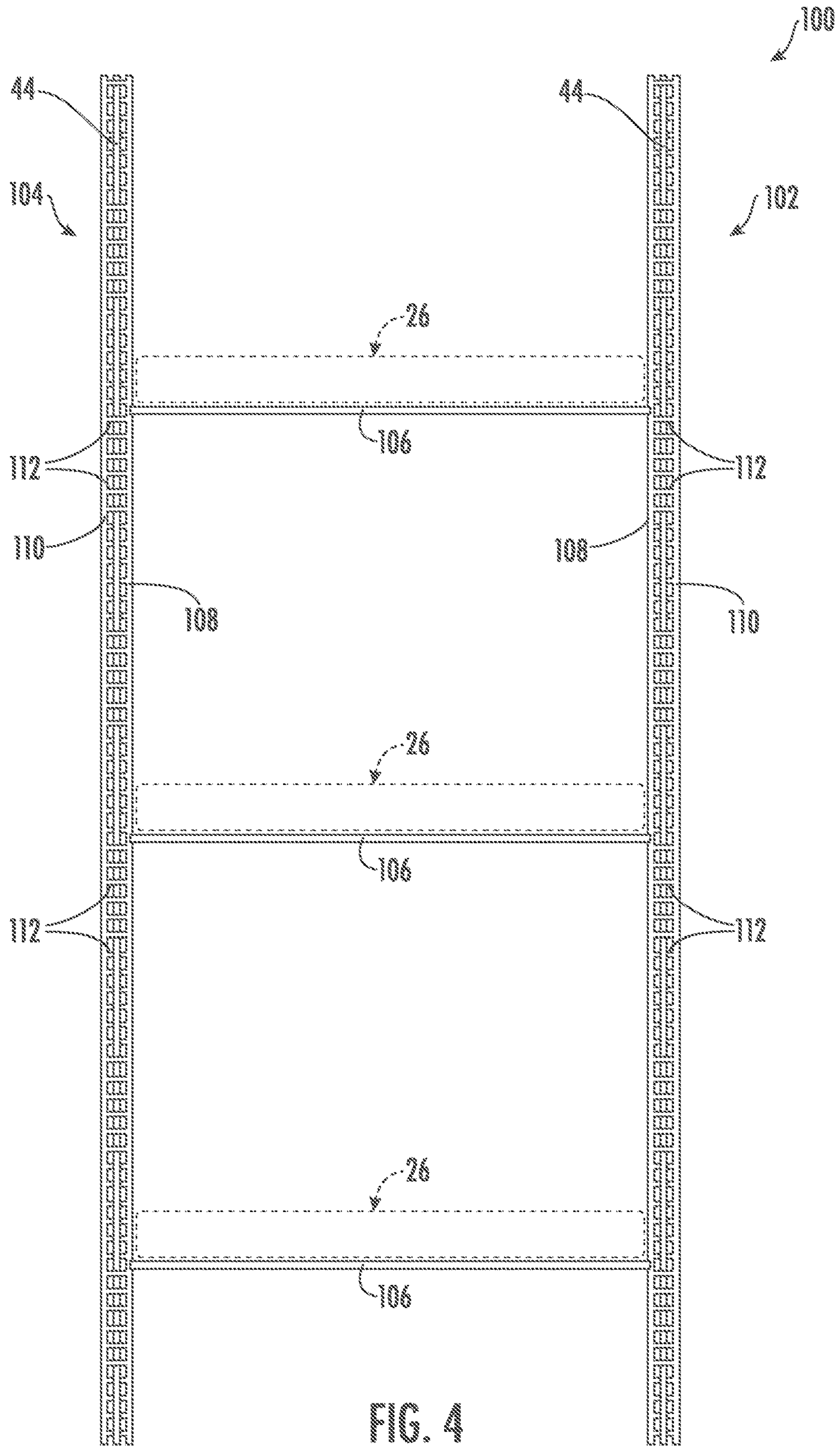
FIG. 4 illustrates an alternative embodiment of the ladder tape assembly shown in FIG. 3 in accordance with aspects of the present subject matter, particularly illustrating front and rear ladder rails of the ladder tape assembly forming an alternative cord ladder construction for retaining the front and rear lift cords of the blind.

In even further embodiments, the crosswise cords 112 of each ladder rail 102, 104 may be uniformly or substantially uniformly spaced apart from one another across all or a substantial portion of the length of the ladder rail 102, 104 so as to create a cord ladder having a continuous shroud-like construction along the ladder rail 102, 104 (as opposed to spaced apart shroud sections 114). For instance, FIG. 4 illustrates a side view of an alternative embodiment of the ladder tape assembly 100 shown in FIGS. 2 and 3 in which each ladder rail 102, 104 includes uniformly spaced crosswise cords 112 extending between the inner and outer rail cords 108, 110 along the entirety of the length of the ladder rail 102, 104. In such an embodiment, each lift cord 42, 44 may be woven through its respective ladder rail 102, 104 in any suitable manner. For instance, as shown in the illustrated embodiment of FIG. 4, each lift cord 42, 44 is woven in an alternating pattern in which the lift cord 42, 44 passes back-and-forth between opposed sides of the associated ladder rail 102, 104 after extending across a given number or grouping of crosswise cords 112 (e.g., every six crosswise cords 112). Alternatively, each lift cord 42, 44 may be woven in an alternating pattern in which the lift cord 42, 44 passes back-and-forth between opposed sides of the associated ladder rail 102, 104 between each successive adjacent pair of crosswise cords 112.

It should be appreciated that, in embodiments in which the associated blind 20 is only configured to include a single lift cord at the location of each ladder tape assembly 100 (as opposed to a pair of lift cords 42, 44), the ladder tape assembly 100 may still be configured as shown in one or more of the illustrated embodiments. Alternatively, the ladder rail 102, 104 positioned on the side of the blind 20 along which the single lift cord extends may be configured as shown in one or more of the illustrated embodiments, while the opposed ladder rail 102, 104 may have a differing configuration. For instance, the opposed ladder rail 102, 104 may simply include a single cord (e.g., the inner rail cord 108) extending vertically along such opposed ladder rail.

Figure 11:
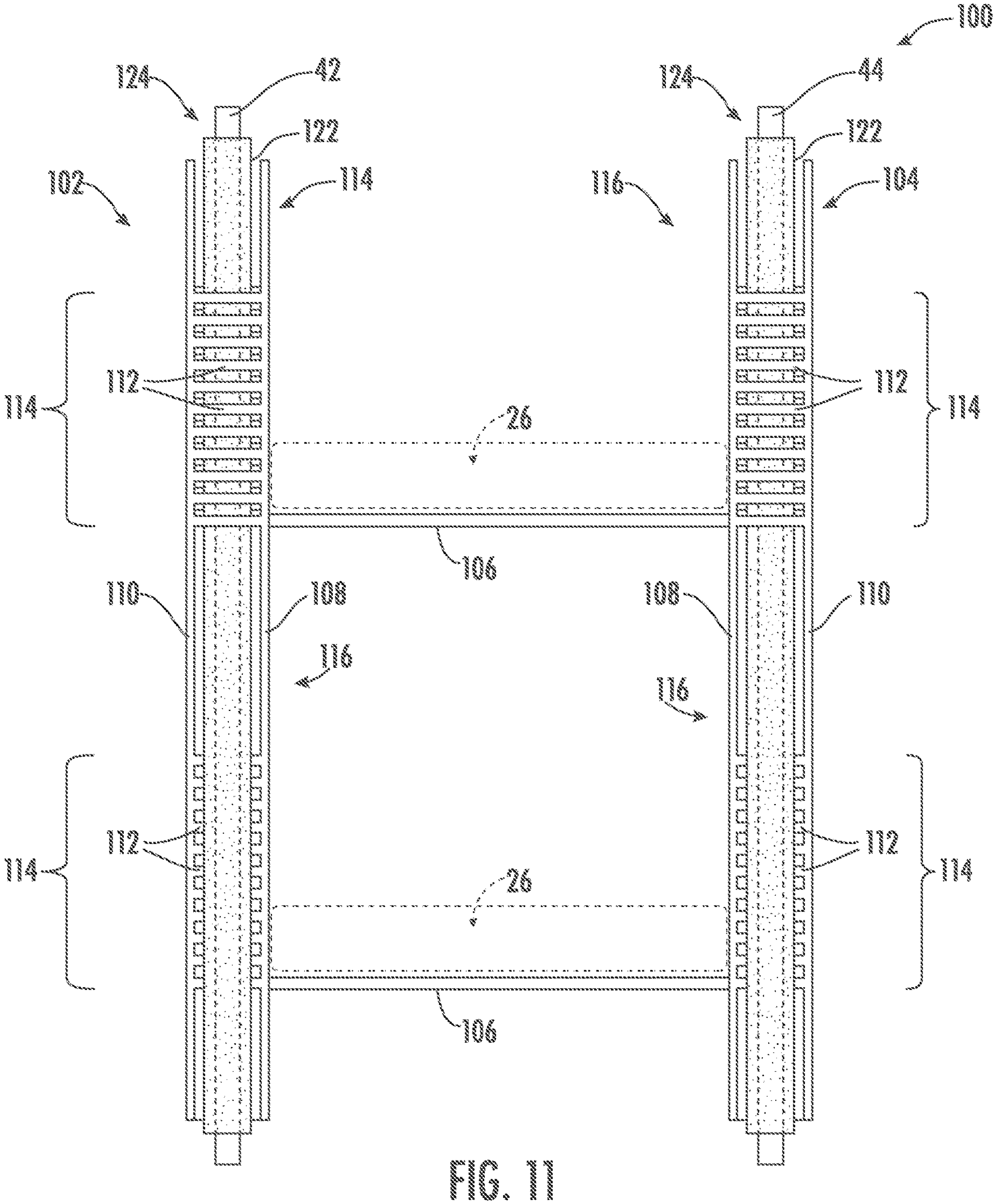
FIG. 11 illustrates another alternative embodiment of the ladder tape assembly shown in FIG. 3 in accordance with aspects of the present subject matter, particularly illustrating the lift cords being encased in separate shrouds, with the cords/shrouds being woven back-and-forth around the shroud sections.

It should also be appreciated that, in addition to being woven back-and-forth between the opposed sides of the cord ladders formed by the ladder rails 102, 104, the lift cords 42, 44 may also, in certain embodiments, be associated with additional cord protection features. For instance, FIG. 11 illustrates yet another embodiment of the ladder tape assembly 100 shown in FIGS. 2 and 3 in which each lift cord 42, 44 is encased or received within a separate cord shroud 122 so as to form a cord/shroud assembly 124. In such an embodiment, the cord/shroud assemblies 124 may be woven back-and-forth between the opposed sides of the ladder rails 102, 104 in any suitable manner, such as by using one or more of the weave patterns described above. For instance, similar to that described above with reference to FIGS. 2 and 3, each cord/shroud assembly 124 may be slidably woven back-and-forth through the longitudinal gaps 116 in an alternating manner around the shroud sections 114 of its respective ladder rail 102, 104 to retain or capture the cord/shroud assembly 124 within such ladder rail 102, 104. The combination of the alternating, back-and-forth weave pattern through the cord ladder, along with the separate shroud 122 surrounding the lift cord 42, 44, serves to substantially confine the lift cord 42, 44 within its respective ladder rail 102, 104, thereby preventing the lift cord 42, 44 from be pulled away or separated from the ladder rail 102, 104.

It should be appreciated that the separate cord shrouds 122 used to encase the lift cords 42, 44 may generally have any suitable shroud configuration and/or may be formed using any suitable manufacturing method. For instance, each cord shroud 122 may correspond to a knitted or woven construction, such as by forming each shroud 122 from a plurality of yarns knitted together to form a tubular-shaped shroud. Alternatively, each shroud 122 may be formed from a flexible polymer material that has been molded to create the desired shape of the shroud.

Figure 5:
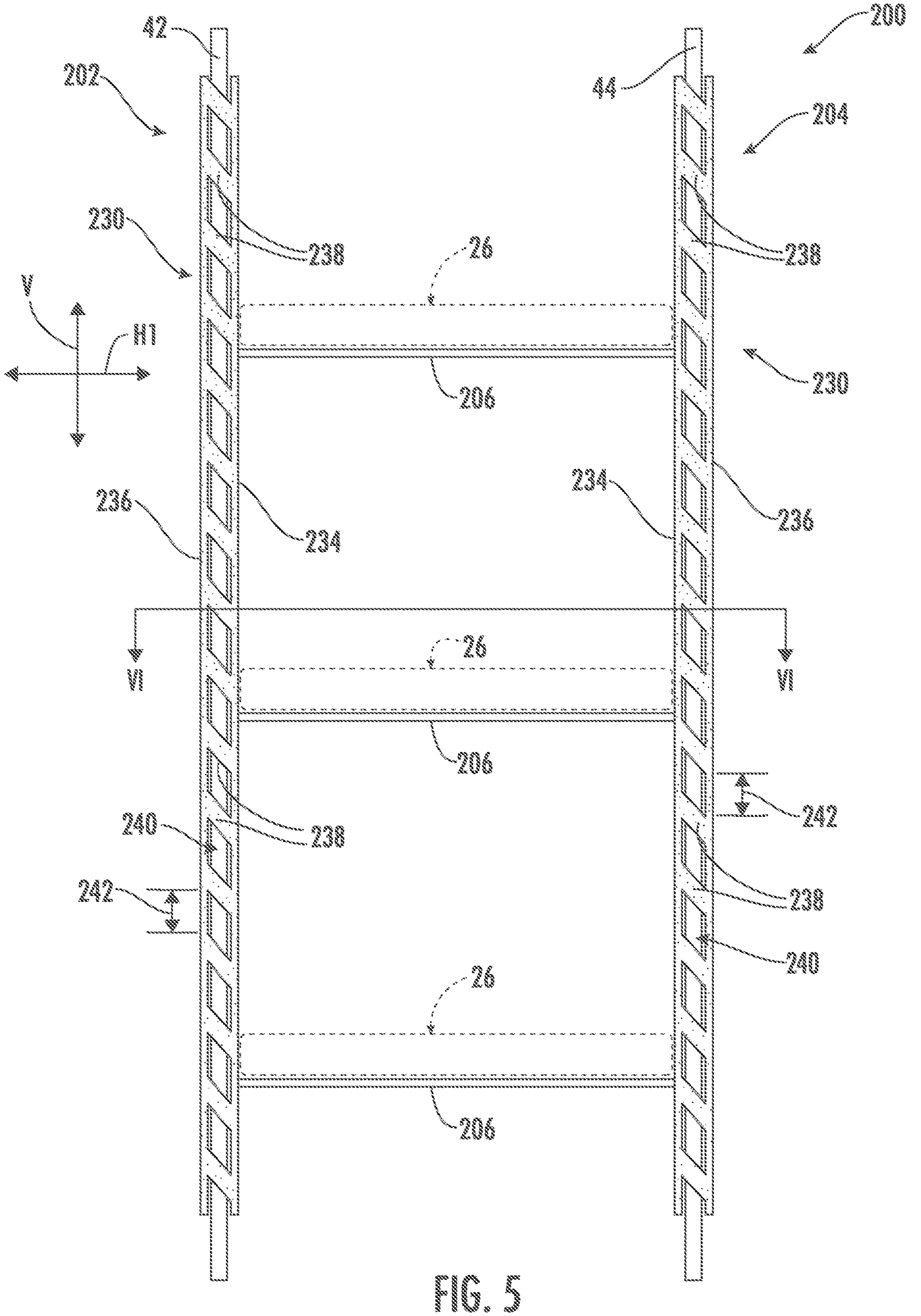
FIG. 5 illustrates a side view of another embodiment of a ladder tape assembly suitable for use within a slatted blind in accordance with aspects of the present subject matter, particularly illustrating front and rear ladder rails of the ladder tape assembly being configured as cord shrouds for retaining the front and rear lift cords of the blind and with slats being supported on the ladder steps of the ladder tape assembly.
Figure 6:
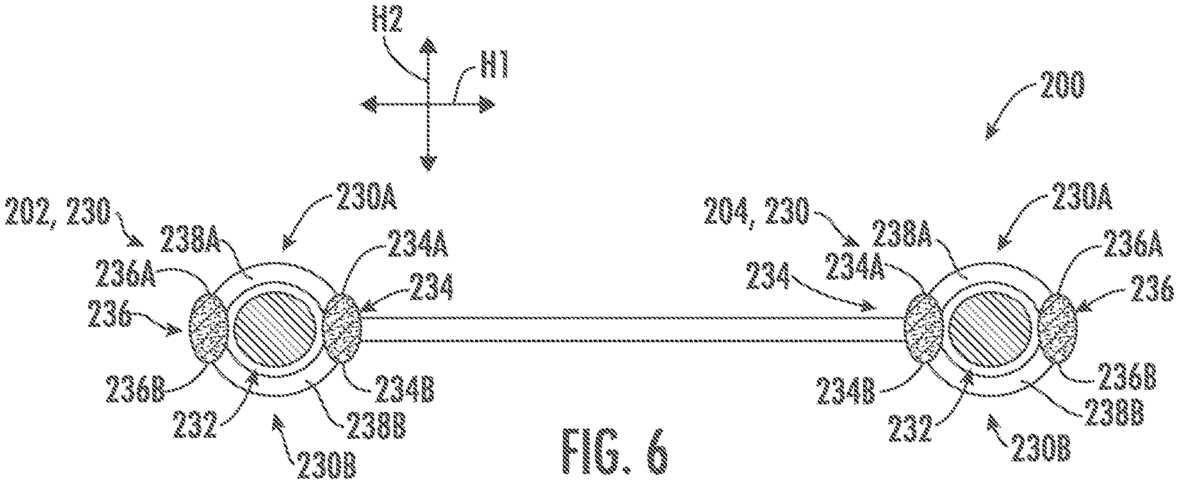
FIG. 6 illustrates a top-down sectional view of the ladder tape assembly shown in FIG. 5 taken about line VI-VI.

Referring now to FIGS. 5 and 6, differing views of yet another embodiment of a ladder tape assembly 200 suitable for use within a slatted blind are illustrated in accordance with aspects of the present subject matter. Specifically, FIG. 5 illustrates a side view of the ladder tape assembly 200 with slats 26 (shown in dashed lines) supported thereon, and FIG. 6 illustrates a top-down sectional view of the ladder tape assembly 200 shown in FIG. 5 taken about line VI-VI (with the slats 26 removed for purposes of illustration). It should be appreciated that, for purposes of description, the ladder tape assembly 200 shown in FIGS. 5 and 6 will generally be described with reference to the blind 20 of FIG. 1. For instance, ladder tape assemblies 200 constructed in the manner described herein may be used as an alternative to the ladder tape assemblies 100 described above. However, one of ordinary skill in the art will readily appreciate that the disclosed ladder tape assembly 200 may be used within any other suitable slatted blind have any other suitable configuration.

As shown in the illustrated embodiment, the ladder tape assembly 200 includes a first or front ladder rail 202, a second or rear ladder rail 204, and a plurality of ladder rungs or steps 206 extending between the front and rear ladder rails 202, 204. In this regard, similar to the ladder tape assembly 100 described above with reference to FIGS. 2-4, the ladder tape assembly 200 shown in FIGS. 5 and 6 may generally be configured to function the same as or similar to a conventional ladder tape with reference to supporting/tiling the slats 26. For example, the ladder steps 206 may be configured to extend between the vertically oriented ladder rails 202, 204 to allow a plurality of slats 26 to be supported thereon for tilting about their respective tilt axes, thereby permitting the associated blind 20 to be transitioned between an opened position or state, at which the slats 26 are supported by the ladder tape assembly 200 in a horizontal orientation, and a closed position or state, at which the slats 26 are supported by the ladder tape assembly 200 at a substantially vertically orientation. As a result, it should be appreciated that the ladder tape assembly 200 may be configured to be provided in operative association with one or more the components of the tilt system 32 of the associated blind 20, such as by coupling all or a portion of the ladder rails 202, 204 of each ladder tape assembly 200 to a tilt drum(s) of a respective tilt station 34 to allow the front and rear ladder rails 202, 204 to be raised/lowered relative to each other to adjust the tilt angle of the slats 26.

Moreover, in accordance with aspects of the present subject matter, the ladder tape assembly 200 may also function to at least partially shroud or limit access to the front and rear lift cords 42, 44 of the blind 20. Specifically, in addition to functioning as front and rear tilt cords for the ladder tape assembly 200, the front and rear ladder rails 202, 204 may also be configured to at least partially encompass or encase the front and rear lift cords 42, 44, respectively. For instance, in several embodiments, each ladder rail 202, 204 may be configured as a cord shroud having a tubular-like construction through which its respective lift cord 42, 44 extends to limit user access to all or a portion of such lift cord 42, 44 along the length of the ladder rail 202, 204.

As shown in the illustrated embodiment of FIGS. 5 and 6, each ladder rail 202, 204 is configured as or forms a tubular-like shroud 230 that at least partially surrounds or encases the lift cord 42, 44 extending therethrough. For instance, each tubular-like shroud 230 may define an interior passageway 232 (FIG. 6) through which its respective lift cord 42, 44 extends. As a result, the lift cords 42, 44 may be at least partially encompassed or encased by the ladder rails 202, 204, thereby limiting access to the lift cords 42, 44 along the exterior of the ladder rails 202, 204 and, thus, preventing a user from pulling one of the lift cords 42, 44 outwardly from its ladder rail 202, 204 and subsequently forming a large loop.

In several embodiments, each tubular-like shroud 230 may include a pair of vertically extending runs (e.g., inner and outer vertical runs 234, 236) and a plurality of connector arms 238 extending between and connecting the inner and outer vertical runs 234, 236. As shown in the illustrated embodiment, the inner and outer vertical runs 234, 236 are spaced apart horizontally from each other, such as in a first horizontal direction (indicated by arrow H1). Additionally, as particularly shown in FIG. 6, the connector arms 238 are configured to extend between the inner and outer vertical runs 234, 236 (e.g., in the first horizontal direction H1) along both sides of the cord shroud 230 to form the tubular-like construction. Specifically, a first subset of the connector arms 238A (FIG. 6) extends between a first side 234A of the inner vertical run 234 and an adjacent first side 236A of the outer vertical run 236 such that each first connector arm 238A forms a portion of a first sidewall or side 230A of the cord shroud 230. Similarly, as shown in FIG. 6, a second subset of the connector arms 238B extends between a second side 234B of the inner vertical run 234 and an adjacent second side 236B of the outer vertical run 236 such that each second connector arm 238B forms a portion of a second sidewall or side 230B of the cord shroud 230, with the second side 230B of the cord shroud 230 being spaced apart from the first side 230A of the cord shroud 230 in a second horizontal direction (indicated by arrow H2) perpendicular to the first horizontal direction H1. As such, the first and second vertical runs 234, 236, together with the sidewalls or sides 230A, 230B formed by the connector arms 238A, 238B extending between the vertical runs 234, 236, collectively define or form the tubular-like construction of each cord shroud 230. In particular, with the vertical runs 234, 236 separated from each other in the first horizontal direction H1 and the first and second subsets of connecter arms 238A, 238B separated from each other in the second horizontal direction H2, the interior passageway 232 of the cord shroud 230 is generally defined between the opposed vertical runs 234, 236 in the first horizontal direction H1 and the opposed connecter arms 238A, 238B in the second horizontal direction H2.

As particularly shown in FIG. 5, in one embodiment, the connector arms 238 may be oriented diagonally such that each connector arm 238 extends in both a vertical direction (indicated by arrow V) and the first horizontal direction H1 between the inner and outer vertical runs 234, 236 of each ladder rail 202, 204. In such an embodiment, the connector arms 238 may be configured to provide a helical-type arrangement or pattern across the opposed sides 230A, 230B of the cord shroud 230 along which the connector arms 238 extend. However, in other embodiments, the connector arms 238 may have any other suitable orientation between the inner and outer vertical runs 234, 236 of each ladder rail 202, 204. For instance, in one alternative embodiment, the connector arms 238 may be configured to extend horizontally between the inner and outer vertical runs 234, 236 (e.g., in the first horizonal direction H1).

Figure 7:
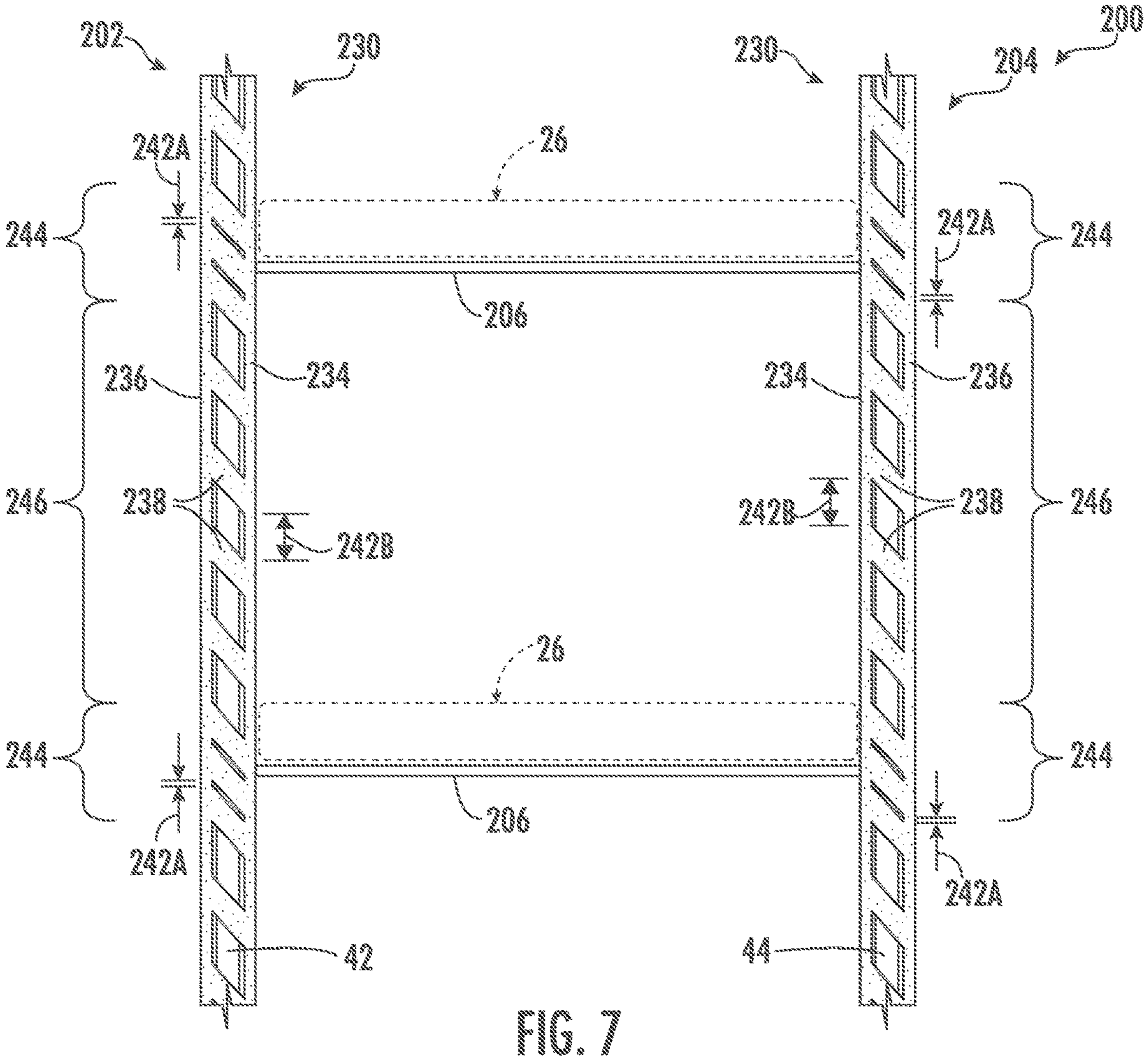
FIG. 7 illustrates an alternative embodiment of the ladder tape assembly shown in FIG. 5 in accordance with aspects of the present subject matter, particularly illustrating the connector arms of the cord shroud of the ladder tape assembly having variable vertical spacing along the length of each ladder rail.

Additionally, in several embodiments, the connector arms 238 are configured to be spaced apart vertically from one another such that longitudinal or vertical gaps 240 are defined between adjacent pairs of connector arms 238 along each side 230A, 230B of the cord shroud 230. For instance, in the illustrated embodiment, the connector arms 238 are substantially informally spaced apart along each side 230A, 230B of the cord shroud 230. As a result, a vertical height or spacing 242 between each adjacent pair of connector arms 238 is substantially the same. However, in other embodiments, the connector arms 238 may be spaced apart from one another in a non-uniform manner along the length of each ladder rail 202, 204. For instance, FIG. 7 illustrates an alternative embodiment of the ladder tape assembly 200 shown in FIGS. 5 and 6 in which the connector arms 238 have variable vertical spacing along the length of each ladder rail 202, 204. Specifically, as shown in FIG. 7, the spacing of the connector arms 238 varies depending on the vertical positioning of such connecter arms relative 238 to the ladder steps 206 of the ladder tape assembly 200. For example, the connector arms 238 positioned along vertical sections 244 of each ladder rail 202, 204 that are generally aligned with or disposed proximal to the ladder steps 206 have a first vertical spacing 242A defined therebetween, while the connector arms 238 positioned along vertical sections 246 of each ladder rail 202, 204 that are generally offset from or that extend vertically between adjacent ladder steps 206 have a second vertical spacing 242B defined therebetween. As shown in FIG. 7, in one embodiment, the first vertical spacing 242A is smaller than the second vertical spacing 242B such that the connector arms 238 aligned with or otherwise disposed proximal to the ladder steps 206 are grouped closer together, thereby providing additional structural integrity to the ladder rails 202, 204 at the locations at which the ladder steps 206 connect to the rails 202, 204. Of course, it should be appreciated that, in other embodiments, the connector arms 238 may be provided with any other suitable variable spacing arrangement.

Based on the above-described configuration, it should be appreciated that the cord shroud 230 associated with each ladder rail 202, 204 is generally configured to extend around the outer perimeter of its respective lift cord 42, 44 so as to generally cover or encase the lift cord 42, 44 except at the locations of the gaps 240 defined between adjacent connector arms 238. In this regard, one of ordinary skill in the art should readily appreciate that the amount of cord coverage provided by the cord shrouds 230 may generally vary depending on the vertical spacing 242 of the connector arms 238. For instance, by decreasing the vertical spacing 242 between adjacent connector arms 238, each cord shroud 230 may be configured to cover or encase a larger percentage of its respective lift cord 42, 44. Thus, by carefully tailoring or selecting the vertical spacing 242 between adjacent connector arms 238, the cord shrouds 230 can be adapted to provide a wide range of cord coverages, depending on the desired application. For instance, based on the vertical spacing 242 of the connector arms 238, each cord shroud 230 may be constructed such that it covers at least 25% of the outer surface area of its respective lift cord 42, 44, such as by configuring the cord shrouds 230 to provide cord coverage ranging from greater than 40% of the outer surface area of the lift cords 42, 44 to less than 95% of the outer surface area of the lift cords 42, 44, or from greater than 50% of the outer surface area of the lift cords 42, 44 to less than 90% of the outer surface area of the lift cords 42, 44, or from greater than 60% of the outer surface area of the lift cords 42, 44 to less than 80% of the outer surface area of the lift cords 42, 44 and/or any other subranges therebetween.

In one embodiment, the tubular shroud 230 of each ladder rail 202, 204 may be manufactured as a continuous or integral construction, such as by forming each shroud 230 from a plurality of yarns knitted together into a tubular-like member via a continuous knitting process. For instance, in a particular embodiment, the inner and outer vertical runs 234, 236 may be formed by two or more yarns that are knitted together to create continuous vertical runs along the ladder rail 202, 204, with the connector arms 238 corresponding to cross-stiches spanning between the inner and outer vertical runs 234, 236. Moreover, in one embodiment, it should be appreciated that the entire ladder tape assembly 200 (including the front and rear ladder rails 202, 204 and the associated ladder steps 206) may be formed as an integral knitted construction in which a plurality of yarns are knitted together to form the desired ladder/shroud configuration. Alternatively, each ladder rail 202, 204 may be formed separately as a knitted construction, with the ladder rails 202, 204 being subsequently coupled or connected together by securing the ladder steps 206 therebetween.

It should also be appreciated that, in embodiments in which the associated blind 20 is only configured to include a single lift cord at the location of each ladder tape assembly 200 (as opposed to a pair of lift cords 42, 44), the ladder tape assembly 200 may still be configured as shown in one or more of the illustrated embodiments. Alternatively, the ladder rail 202, 204 positioned on the side of the blind 20 along which the single lift cord extends may be configured as shown in one or more of the illustrated embodiments, while the opposed ladder rail 202, 204 may have a differing configuration. For instance, the opposed ladder rail 202, 204 may simply include a single rail cord extending vertically along such opposed ladder rail.

Figure 8:
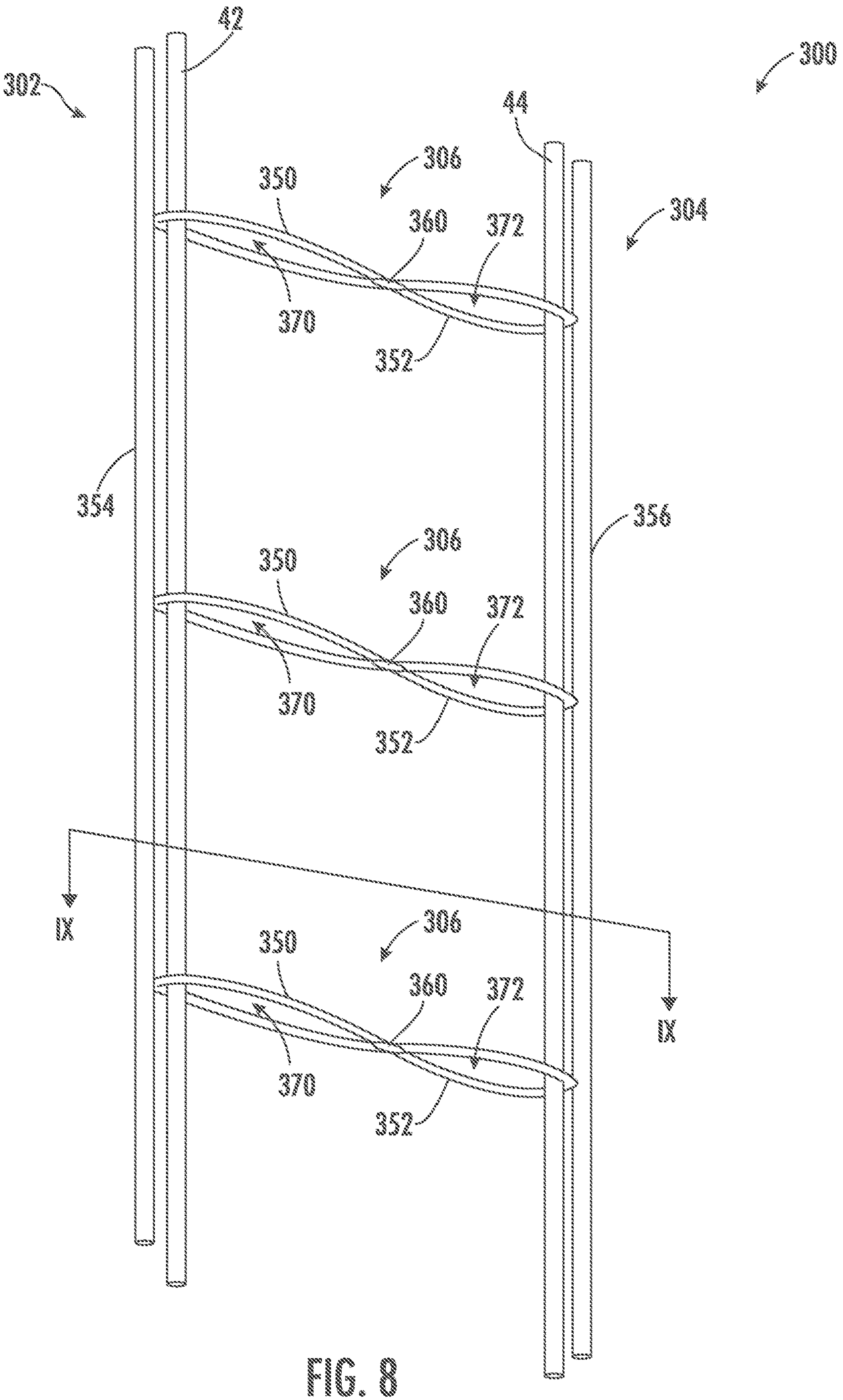
FIG. 8 illustrates a perspective view of yet another embodiment of a ladder tape assembly suitable for use within a slatted blind in accordance with aspects of the present subject matter, particularly illustrating separate shroud loops formed by the ladder steps of the ladder tape assembly for retaining the front and rear lift cords of the blind.
Figure 9:
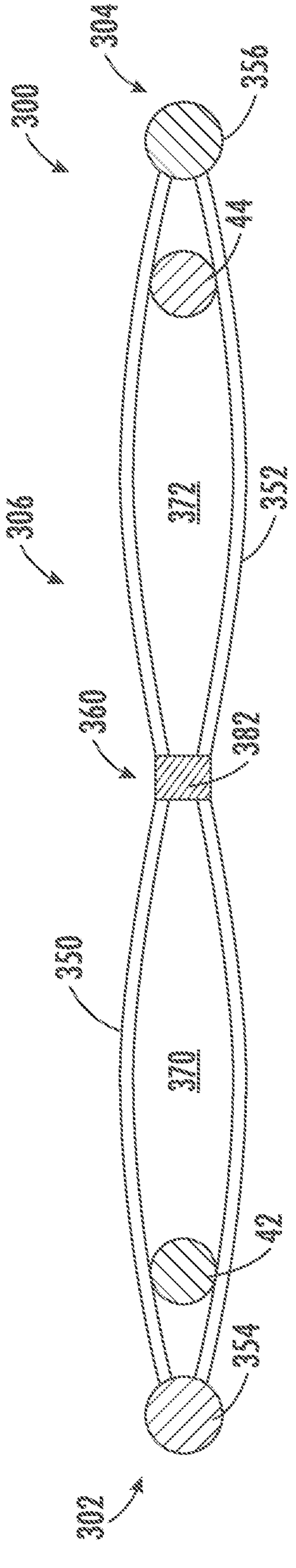
FIG. 9 illustrates a top-down sectional view of the ladder tape assembly shown in FIG. 8 taken from the perspective of line IX-IX, particularly illustrating first and second rung cords of one of the ladder steps coupled together via a fastener to form the shroud loops.

Referring now to FIGS. 8 and 9, differing views of an even further embodiment of a ladder tape assembly 300 suitable for use within a slatted blind are illustrated in accordance with aspects of the present subject matter. Specifically, FIG. 8 illustrates a perspective view of the ladder tape assembly 300 and FIG. 9 illustrates a top-down sectional view of the ladder tape assembly 300 shown in FIG. 8 taken from the perspective of line IX-IX. It should be appreciated that, for purposes of description, the ladder tape assembly 300 shown in FIGS. 8 and 9 will generally be described with reference to the blind 20 of FIG. 1. For instance, ladder tape assemblies 300 constructed in the manner described herein may be used as an alternative to the ladder tape assemblies 100, 200 described above. However, one of ordinary skill in the art will readily appreciate that the disclosed ladder tape assembly 300 may be used within any other suitable slatted blind have any other suitable configuration.

As shown in the illustrated embodiment, the ladder tape assembly 300 includes a first or front ladder rail 302, a second or rear ladder rail 304, and a plurality of ladder rungs or steps 306 extending between the front and rear ladder rails 302, 304. In this regard, similar to the ladder tape assemblies 100, 200 described above, the ladder tape assembly 300 shown in FIGS. 8 and 9 may generally be configured to function the same as or similar to a conventional ladder tape with reference to supporting/tilting the slats 26. For example, the ladder steps 306 may be configured to extend between the vertically oriented ladder rails 302, 304 to allow a plurality of slats 26 (FIG. 1) to be supported thereon for tilting about their respective tilt axes, thereby permitting the associated blind 20 to be transitioned between an opened position or state, at which the slats 26 are supported by the ladder tape assembly 300 in a horizontal orientation, and a closed position or state, at which the slats 26 are supported by the ladder tape assembly 300 at a substantially vertically orientation. As a result, it should be appreciated that the ladder tape assembly 300 may be configured to be provided in operative association with one or more of the components of the tilt system 32 of the associated blind 20, such as by coupling all or a portion of the ladder rails 302, 304 of the ladder tape assembly 300 to a tilt drum(s) of a respective tilt station 34 to allow the front and rear ladder rails 302, 304 to be raised/lowered relative to each other to adjust the tilt angle of the slats 26.

Moreover, in accordance with aspects of the present subject matter, the ladder tape assembly 300 may also function to at least partially shroud or limit access to the front and rear lift cords 42, 44 of the blind 20. Specifically, in addition to functioning as support elements for the slats 26, the ladder steps 306 may also be configured to capture or retain portions of the front and rear lift cords 42, 44. For instance, as will be described below, each ladder step 306 may be configured to form or define a pair of shroud rings or loops for receiving the lift cords 42, 44.

As shown in FIGS. 8 and 9, in one embodiment, each ladder step 306 of the ladder tape assembly 300 includes two or more rung cords, such as a pair of rung cords (e.g., a first rung cord 350 and a second rung cord 352), with the first and second rung cords 350, 352 extending horizontally or transverse between front and rear rail cords 354, 356 forming the front and rear ladder rails 302, 304, respectively. Additionally, in accordance with aspects of the present subject matter, the rung cords 350, 352 of each ladder step 306 are configured to be attached or coupled to each other at a connection point 360 defined between the front and rear ladder rails 302, 304, thereby resulting in the formation of a pair of shroud loops 370, 372 directly between the ladder rails 302, 304 for retaining the lift cords 42, 44. Specifically, as shown in FIGS. 8 and 9, the first and second rung cords 350, 352 of each ladder step 306 are coupled together at a connection point 260 such that a first or front shroud loop 370 is formed by front portions of the rung cords 350, 352 extending between the front ladder rail 302 and the connection point 360, and a second or rear shroud loop 372 is formed by rear portions of the rung cords 350, 352 extending between the rear ladder rail 304 and the connection point 360. In such an embodiment, the front lift cord 42 may be threaded or inserted through the front shroud loop 370 formed at each ladder step 306, while the rear lift cord 44 may be threaded or inserted through the rear shroud loop 372 formed at each ladder step 306, with each lift cord 42, 44 being isolated or separated from the other lift cord via the connection provided between the rung cords 3500, 352 at the connection point 360. As such, by threading the lift cords 42, 44 through the various shroud loops 370, 372, the lift cords 42, 44 may be separately retained or captured at each ladder step 306 along the length of the ladder tape assembly 300, thereby preventing a user from pulling one of the lift cords 42, 44 outwardly from the ladder tape assembly 300 and subsequently forming a large loop. Such isolation or separation of the lift cords 42, 44 may also help to prevent the cords from twisting or tangling with each other during manufacturing and/or during use.

It should be appreciated that, although the illustrated embodiment only shows a single connection point 360 formed between the rung cords 350, 352 of each ladder step 306, two or more connections points 360 may, instead, be formed between the rung cords 350, 352 of each ladder step 306. For instance, it may be desirable to include a first connection point between the rung cords 350, 352 at a location closer to front ladder rail 302 and a second connection point between the rung cords 350, 352 at a location closer to the rear ladder rail 304, thereby forming tighter or smaller shroud loops for retaining lift cords. Additionally, multiple connection points may be formed between the rung cords 350, 352 of each ladder step 306 to allow any suitable number of shroud loops to be formed between the front and rear ladder rails 302, 304.

Additionally, it should be appreciated that, in embodiments in which the rung cords 350, 352 of each ladder step 306 are configured to be connected to each other at a given connection point 360 to form the separate shroud loops 370, 372, such cord-to-cord connections may be achieved using any suitable means. In several embodiments, one or more fasteners may be used to couple the first and second rung cords 350, 352 together at the connection point 360. For instance, as particularly shown in FIG. 9, a mechanical fastener(s), such as a plastic or metal clip(s), may be used to couple the first and second rung cords 350, 352 together at the connection point 360. Alternatively, any other suitable fastener may be used to connect the first and second rung cords 350, 352 to each other. For instance, one or more cross-stiches may be used to attach the first and second rung cords 352, 352 together at the connection point 360.

Figure 10:
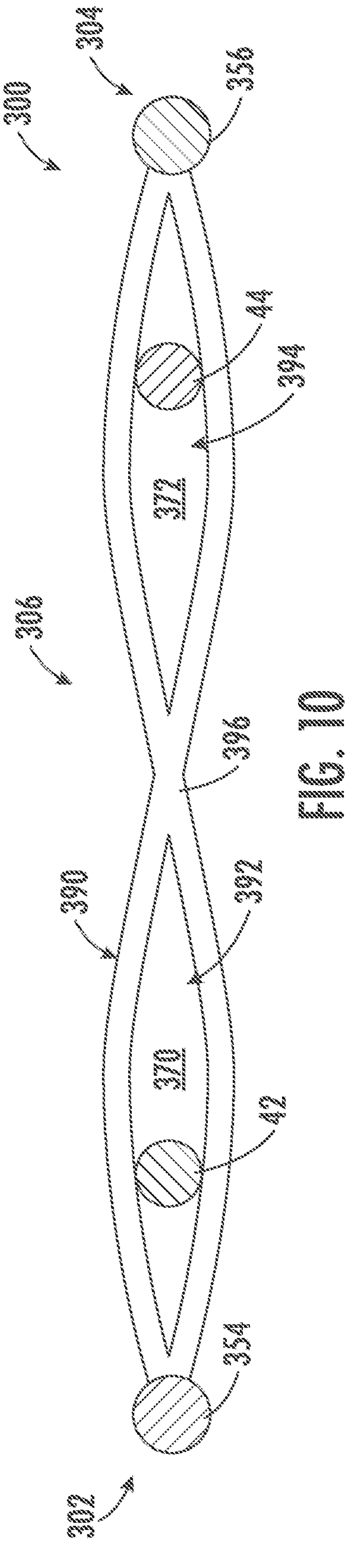
FIG. 10 illustrates an alternative embodiment of the ladder tape assembly shown in FIG. 9 in accordance with aspects of the present subject matter, particularly illustrating a ladder step of the ladder tape assembly formed from a single rung cord that defines separate shroud loops for retaining the front and rear lift cords of the blind.

It should also be appreciated that, as an alternative to forming each ladder step 306 from separate rung cords that are coupled to each other to form the separate shroud loops 370, 372, each ladder step 306 may, instead, be formed by a single rung cord in which openings are defined to form the separate shroud loops 370, 372. For example, FIG. 10 illustrates another alternative embodiment of the ladder tape assembly 300 shown in FIG. 9 in which a single run cord 390 extends between the front and rear ladder rails 302, 304 to form each ladder step 306. In such an embodiment, the rung cord 390 may be split or otherwise formed so as to define a pair of shroud openings 392, 394 separated from each other via a continuous section or bridge 396 of the rung cord 390, thereby creating separate front and rear shroud loops 370, 372 between the ladder rails 302, 304 for receiving the front and rear lift cords 42, 44, respectively.

Figure 12:
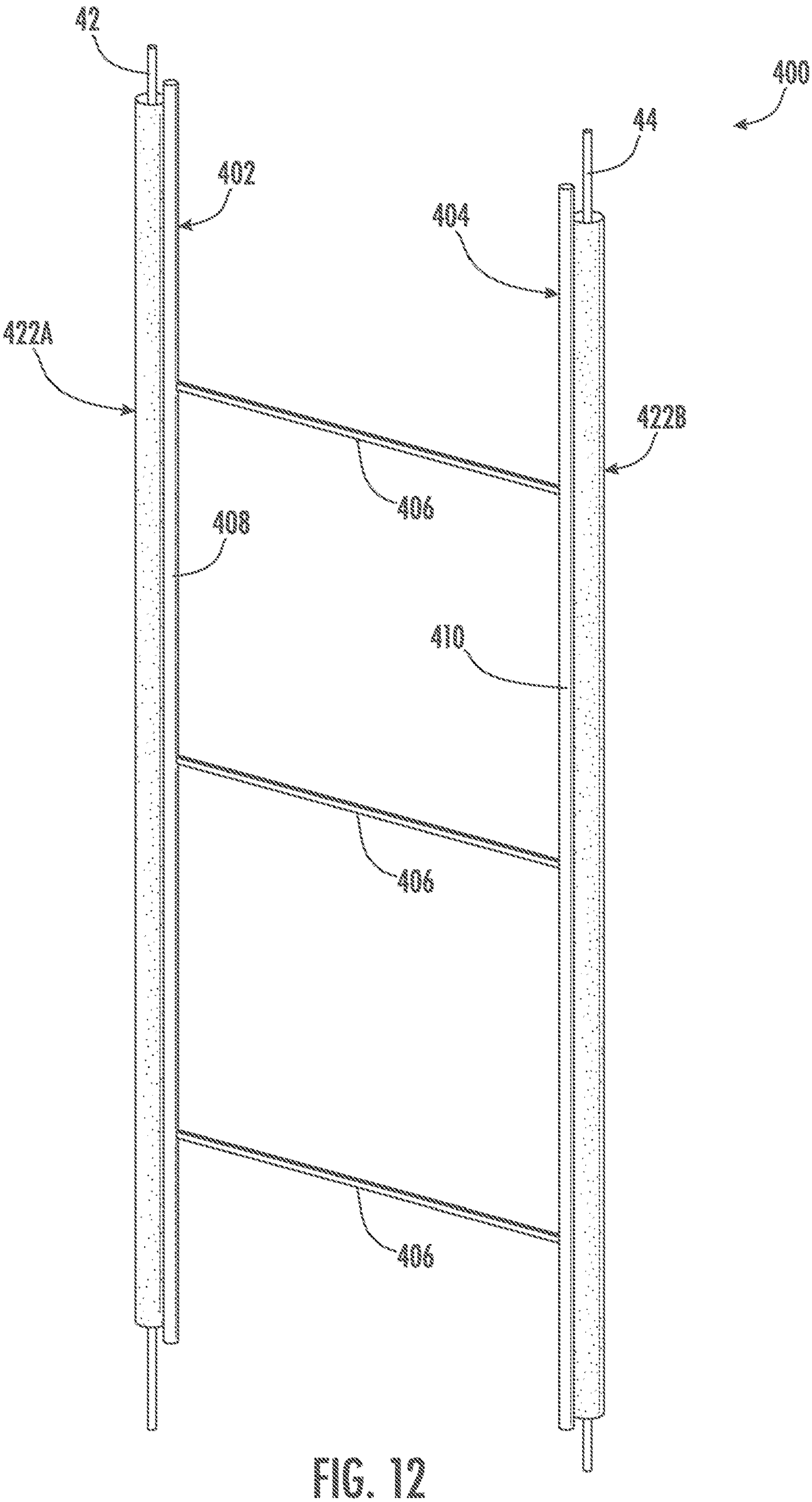
FIG. 12 illustrates a perspective view of yet another embodiment of a ladder tape assembly suitable for use within a slatted blind in accordance with aspects of the present subject matter, particularly illustrating separate cord shrouds coupled to the ladder tape assembly along the length of the ladder rail of the assembly.

Referring now to FIG. 12, a perspective view of yet another embodiment of a ladder tape assembly 400 suitable for use within a slatted blind are illustrated in accordance with aspects of the present subject matter. It should be appreciated that, for purposes of description, the ladder tape assembly 400 shown in FIG. 12 will generally be described with reference to the blind 20 of FIG. 1. For instance, ladder tape assemblies 400 constructed in the manner described herein may be used as an alternative to the ladder tape assemblies 100, 200, 300 described above. However, one of ordinary skill in the art will readily appreciate that the disclosed ladder tape assembly 400 may be used within any other suitable slatted blind have any other suitable configuration.

As shown in the illustrated embodiment, the ladder tape assembly 400 includes a first or front ladder rail 402, a second or rear ladder rail 404, and a plurality of ladder rungs or steps 406 extending between the front and rear ladder rails 402, 404. In one embodiment, each ladder rail 402, 404 is formed from or includes a respective rail cord 408, 410, with the steps 406 extending directly between the vertically oriented rail cords 408, 410. In this regard, similar to the ladder tape assemblies 100, 200, 300 described above, the ladder tape assembly 400 shown in FIG. 12 may generally be configured to function the same as or similar to a conventional ladder tape with reference to supporting/tilting the slats 26. For example, the ladder steps 406 may be configured to extend between the vertically oriented ladder rails 402, 404 to allow a plurality of slats 26 (FIG. 1) to be supported thereon for tilting about their respective tilt axes, thereby permitting the associated blind 20 to be transitioned between an opened position or state, at which the slats 26 are supported by the ladder tape assembly 400 in a horizontal orientation, and a closed position or state, at which the slats 26 are supported by the ladder tape assembly 400 at a substantially vertically orientation. As a result, it should be appreciated that the ladder tape assembly 400 may be configured to be provided in operative association with one or more of the components of the tilt system 32 of the associated blind 20, such as by coupling all or a portion of the ladder rails 402, 404 of the ladder tape assembly 400 to a tilt drum(s) of a respective tilt station 34 to allow the front and rear ladder rails 402, 404 to be raised/lowered relative to each other to adjust the tilt angle of the slats 26.

Moreover, in accordance with aspects of the present subject matter, the ladder tape assembly 400 may also function to at least partially shroud or limit access to the front and rear lift cords 42, 44 of the blind 20. Specifically, as shown in the illustrated embodiment, the ladder tape assembly 400 includes first and second shrouds 422A, 422B provided in operative association with the first and second ladder rails 402, 404, respectively, of the ladder tape assembly 400. Each shroud 422A, 422B may generally have a tubular-like construction configured to allow a respective lift cord 42, 44 to pass therethrough. In this regard, each shroud 422A, 442B may encompass or encase its respective lift cord 42, 44, thereby limiting access to the lift cords 42, 44 and, thus, preventing a user from pulling one of the lift cords 42, 44 outwardly from the ladder tape assembly 400 in a manner that allows the lift cord 42, 44 to be formed into a large loop.

As shown in the illustrated embodiment, each shroud 422A, 422B is generally configured to be connected or coupled to its respective ladder rail 402, 404 in a continuous or substantially continuous manner along the vertical height of the ladder tape assembly 400. Specifically, as shown in FIG. 12, the first shroud 422A is configured to be coupled to the rail cord 408 forming the first ladder rail 402 continuously or substantially continuously along the length of such rail cord 408, while the second shroud 422B is configured to be coupled to the rail cord 410 forming the second ladder rail 404 continuously or substantially continuously along the length of such rail cord 410. As such, the shrouds 422A, 422B may function to retain the lift cords 42, 44 at locations directly adjacent to ladder rails 42, 44 along the vertical height of the ladder tape assembly 400.

It should be appreciated that the continuous or substantially continuous connection between each shroud 422A, 422B and the adjacent rail cord 408, 410 may generally be achieved using any suitable attachment method or connection means. For instance, each shroud 422A, 422B may be sewn, bonded, crimped, and/or clipped to its respective cord 408, 410 in a continuous or substantially continuous manner along the lengths of such cords 408, 410, such as by sewing, bonding, crimping, and/or clipping such components together at connection points that are spaced apart vertically from one another by less than a minimal spacing distance. Specifically, in one embodiment, each shroud 422A, 422B may be sewn, bonded, crimped, and/or clipped to its respective cord 408, 410 at connection points that are spaced apart vertically from one another by less than one inch, such as less than 0.75 inches, or less than 0.5 inches, or less than 0.25 inches, and/or any other subranges therebetween.

Figure 13:
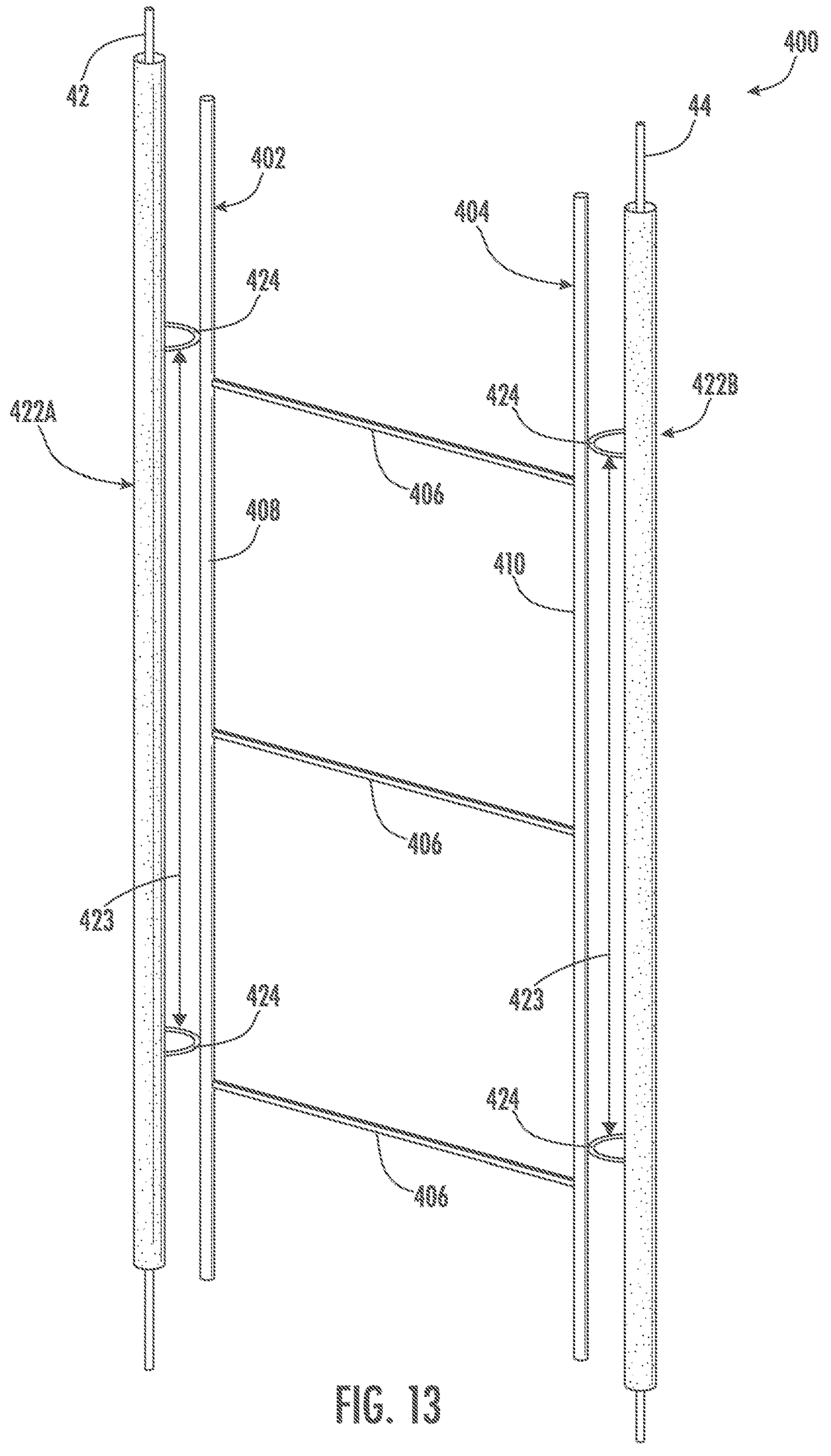
FIG. 13 illustrates an alternative embodiment of the ladder tape assembly shown in FIG. 12 in accordance with aspects of the present subject matter, particularly illustrating separate shrouds coupled to the ladder rails of the ladder tape assembly at spaced apart locations.

As an alternative to coupling the shrouds 422A, 422B to the ladder cords 408, 410 in a continuous or substantially continuous manner along the length of the ladder rails 402, 404, each shroud 422A, 422B may, instead, be configured to be coupled to its respective rail 402, 404 in a non-continuous manner or at significantly spaced apart intervals along the length of the ladder rails 402, 404. For instance, FIG. 13 illustrates an alternative embodiment of the ladder tape assembly 400 shown in FIG. 12 in which the shrouds 422A, 422B are coupled to the ladder rails 402, 404 with significant vertical gaps 423 defined between neighboring connection points. Specifically, as shown in the illustrated embodiment, each shroud 422A, 422B is coupled to its respective ladder cord 408, 410 via connection loops 424 spaced apart vertically along the length of the ladder tape assembly 400.

Figure 14:
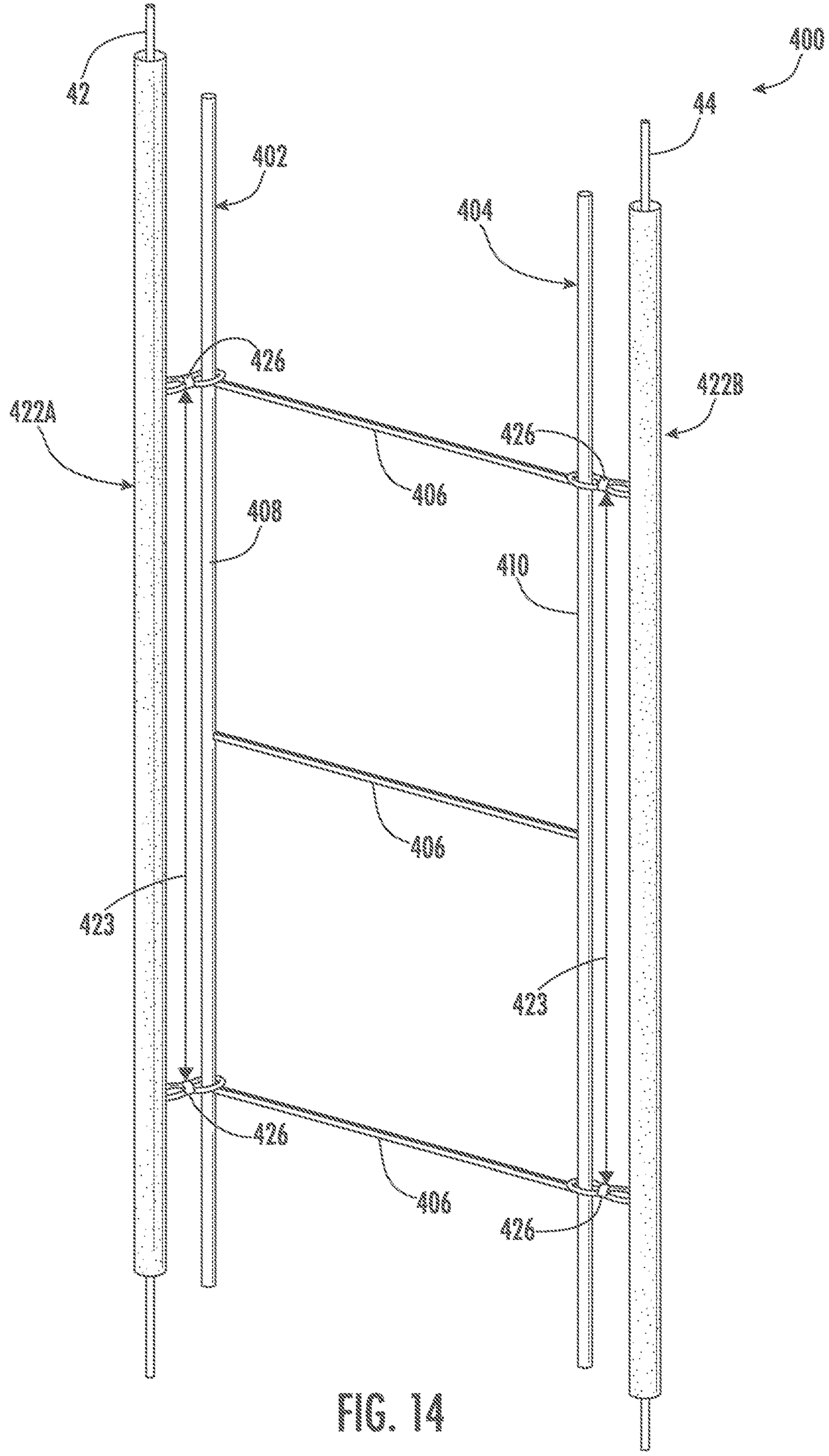
FIG. 14 illustrates an alternative embodiment of the ladder tape assembly shown in FIG. 13 in accordance with aspects of the present subject matter, particularly illustrating separate shrouds coupled to the ladder rails of the ladder tape assembly at spaced apart locations using mechanical fasteners.

However, in other embodiments, each shroud 422A, 422B may be coupled to its respective ladder cord 408, 410 at spaced apart locations using any other suitable attachment method or connection means, such as by sewing, bonding, crimping, and/or clipping such components together at vertically spaced connection points. For instance, FIG. 14 illustrates an alternative embodiment of the ladder tape assembly 400 shown in FIG. 13 in which the shrouds 422A, 422B are coupled to the ladder rails 402, 404 at spaced apart locations using mechanical fasteners 426. Suitable mechanical fasteners may include, for example, clips, split rings, hooks, and/or the like. Additionally, in embodiments in which each mechanical fastener 426 has a slidable connection with the adjacent ladder rail 402, 404, it should be appreciated that the ladder steps 406 may serve to limit vertical travel of the mechanical fasteners 426 (and, thus, the shrouds 422A, 422B coupled thereto) relative to the remainder of the ladder tape assembly 400.

It should be appreciated that the distance or vertical spacing associated with the gaps 423 defined between neighboring connection points between each shroud 422A, 422B and its respective ladder cord 408, 410 may, in several embodiments, be selected to allow the shrouds 422A, 422B to fold side-to-side or otherwise take on a serpentine-like profile as the associated covering 20 is moved towards the retracted or raised position. For instance, in one embodiment, the vertical spacing defined between neighboring connection points may be greater than 1 inch, such as greater than 2 inches or greater than 3 inches, or greater than 4 inches, or greater than 5 inches.

It should also be appreciated that the separate cord shrouds 422 used to encase the lift cords 42, 44 may generally have any suitable shroud configuration and/or may be formed using any suitable manufacturing method. For instance, each cord shroud 422 may correspond to a knitted or woven construction, such as by forming each shroud 422 from a plurality of yarns knitted together to form a tubular-shaped shroud. Alternatively, each shroud 422 may be formed from a flexible polymer material that has been molded to create the desired shape of the shroud.

Additionally, it should be appreciated that, in embodiments in which the associated blind 20 is only configured to include a single lift cord at the location of each ladder tape assembly 400 (as opposed to a pair of lift cords 42, 44), the ladder tape assembly 400 may still be configured as shown in one or more of the illustrated embodiments. Alternatively, the ladder rail 402, 404 positioned on the side of the blind 20 along which the single lift cord extends may have a shroud coupled thereto for receipt of the lift cord, while the opposed ladder rail 402, 404 may not include a shroud coupled thereto.

While the foregoing Detailed Description and drawings represent various embodiments, it will be understood that various additions, modifications, and substitutions may be made therein without departing from the spirit and scope of the present subject matter. Each example is provided by way of explanation without intent to limit the broad concepts of the present subject matter. In particular, it will be clear to those skilled in the art that principles of the present disclosure may be embodied in other forms, structures, arrangements, proportions, and with other elements, materials, and components, without departing from the spirit or essential characteristics thereof. For instance, features illustrated or described as part of one embodiment can be used with another embodiment to yield a still further embodiment. Thus, it is intended that the present subject matter covers such modifications and variations as come within the scope of the appended claims and their equivalents. One skilled in the art will appreciate that the disclosure may be used with many modifications of structure, arrangement, proportions, materials, and components and otherwise, used in the practice of the disclosure, which are particularly adapted to specific environments and operative requirements without departing from the principles of the present subject matter. For example, elements shown as integrally formed may be constructed of multiple parts or elements shown as multiple parts may be integrally formed, the operation of elements may be reversed or otherwise varied, the size or dimensions of the elements may be varied. The presently disclosed embodiments are therefore to be considered in all respects as illustrative and not restrictive, the scope of the present subject matter being indicated by the appended claims, and not limited to the foregoing description.

In the foregoing Detailed Description, it will be appreciated that the phrases "at least one", "one or more", and "and/or", as used herein, are open-ended expressions that are both conjunctive and disjunctive in operation. The term "a" or "an" element, as used herein, refers to one or more of that element. As such, the terms "a" (or "an"), "one or more" and "at least one" can be used interchangeably herein. All directional references (e.g., proximal, distal, upper, lower, upward, downward, left, right, lateral, longitudinal, front, rear, top, bottom, above, below, vertical, horizontal, crosswise, radial, axial, clockwise, counterclockwise, and/or the like) are only used for identification purposes to aid the reader's understanding of the present subject matter, and/or serve to distinguish regions of the associated elements from one another, and do not limit the associated element, particularly as to the position, orientation, or use of the present subject matter. Connection references (e.g., attached, coupled, connected, joined, secured, mounted and/or the like) are to be construed broadly and may include intermediate members between a collection of elements and relative movement between elements unless otherwise indicated. As such, connection references do not necessarily infer that two elements are directly connected and in fixed relation to each other. Identification references (e.g., primary, secondary, first, second, third, fourth, etc.) are not intended to connote importance or priority, but are used to distinguish one feature from another.

All apparatuses and methods disclosed herein are examples of apparatuses and/or methods implemented in accordance with one or more principles of the present subject matter. These examples are not the only way to implement these principles but are merely examples. Thus, references to elements or structures or features in the drawings must be appreciated as references to examples of embodiments of the present subject matter, and should not be understood as limiting the disclosure to the specific elements, structures, or features illustrated. Other examples of manners of implementing the disclosed principles will occur to a person of ordinary skill in the art upon reading this disclosure.

This written description uses examples to disclose the present subject matter, including the best mode, and also to enable any person skilled in the art to practice the present subject matter, including making and using any devices or systems and performing any incorporated methods. The patentable scope of the present subject matter is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

The following claims are hereby incorporated into this Detailed Description by this reference, with each claim standing on its own as a separate embodiment of the present disclosure. In the claims, the term "comprises/comprising" does not exclude the presence of other elements or steps. Furthermore, although individually listed, a plurality of means, elements or method steps may be implemented by, e.g., a single unit or processor. Additionally, although individual features may be included in different claims, these may possibly advantageously be combined, and the inclusion in different claims does not imply that a combination of features is not feasible and/or advantageous. In addition, singular references do not exclude a plurality. The terms "a", "an", "first", "second", etc., do not preclude a plurality. Reference signs in the claims are provided merely as a clarifying example and shall not be construed as limiting the scope of the claims in any way.

What is claimed is:

1. A slatted blind, comprising:

a headrail;

a bottom rail movable relative to the headrail;

first and second lift cords extending between the headrail and the bottom rail;

a plurality of slats disposed between the headrail and the bottom rail; and a ladder tape assembly configured to support the plurality of slats between the headrail and the bottom rail, the ladder tape assembly comprising:

a first vertically extending ladder rail;

a second vertically extending ladder rail spaced apart from the first ladder rail; and a plurality of pairs of shroud loops extending between the first and second ladder rails, each pair of shroud loops of the plurality of pairs of shroud loops including a first shroud loop and a second shroud loop disposed between the first and second ladder rails, each pair of shroud loops of the plurality of pairs of shroud loops supporting thereon a respective slat of the plurality of slats such that the respective slat is disposed on top of both the first shroud loop and the second shroud loop of the respective pair of shroud loops of the plurality of pairs of shroud loops;

wherein:

the first lift cord extends vertically through the first shroud loop of each pair of shroud loops and the second lift cord extends vertically through the second shroud loop of each pair of shroud loops;

each pair of shroud loops includes first and second rung cords extending between the first and second ladder rails; and the first and second rung cords are coupled together at a connection point defined between the first and second ladder rails such that the first shroud loop is formed by first portions of the first and second rung cords extending between the first ladder rail and the connection point and the second shroud loop is formed by second portions of the first and second rung cords extending between the second ladder rail and the connection point.

2. The slatted blind of claim 1, wherein the first and second rung cords are coupled together at the connection point via a fastener.

3. The slatted blind of claim 1, wherein the connection point separates the first shroud loop from the second shroud loop such that the first lift cord is isolated from the second lift cord via the connection point of each ladder step.

4. The slatted blind of claim 1, wherein:

the connection point comprises an intermediate connection point defined between the first and second ladder rails;

a first connection point is defined between the first and second rung cords at a location closer to first ladder rail than the intermediate connection point such that the first shroud loop is formed by first portions of the first and second rung cords extending between the first connection point and the intermediate connection point; and a second connection point is defined between the first and second rung cords at a location closer to second ladder rail than the intermediate connection point such that the second shroud loop is formed by second portions of the first and second rung cords extending between the second connection point and the intermediate connection point.

5. The slatted blind of claim 1, wherein the first and second shroud loops extend transversely across a space defined directly between the first and second ladder rails.

6. The slatted blind of claim 5, wherein the first and second lift cords extend vertically across the space defined directly between the first and second ladder rails.

7. The slatted blind of claim 1, wherein each pair of shroud loops of the plurality of shroud loops forms a ladder step, wherein each ladder step extends transversely between the first and second ladder rails from a first end of each ladder step positioned at the first ladder rail to a second end of each ladder step positioned at the second ladder rail.

8. A ladder tape assembly for supporting slats of a slatted blind, the ladder tape assembly comprising:

a first vertically extending ladder rail;

a second vertically extending ladder rail spaced apart from the first ladder rail; and a plurality of pairs of shroud loops extending between the first and second ladder rails, each pair of shroud loops of the plurality of pairs of shroud loops including a first shroud loop and a second shroud loop disposed between the first and second ladder rails, each pair of shroud loops of the plurality of pairs of shroud loops supporting thereon a respective slat of a plurality of slats such that the respective slat is disposed on top of both the first shroud loop and the second shroud loop of a respective pair of shroud loops of the plurality of pairs of shroud loops;

a first lift cord extending vertically through the first shroud loop of each pair of shroud loops; and a second lift cord extending vertically through the second shroud loop of each pair of shroud loops;

wherein:

each pair of shroud loops includes first and second rung cords extending between the first and second ladder rails; and the first and second rung cords are coupled together at a connection point defined between the first and second ladder rails such that the first shroud loop is formed by first portions of the first and second rung cords extending between the first ladder rail and the connection point and the second shroud loop is formed by second portions of the first and second rung cords extending between the second ladder rail and the connection point.

9. The ladder tape assembly of claim 8, wherein the first and second rung cords are coupled together at the connection point via a fastener.

10. The ladder tape assembly of claim 8, wherein the connection point separates the first shroud loop from the second shroud loop such that the first lift cord is configured to be isolated from the second lift cord via the connection point of each ladder step.

11. The ladder tape assembly of claim 8, wherein:

the connection point comprises an intermediate connection point defined between the first and second ladder rails;

a first connection point is defined between the first and second rung cords at a location closer to first ladder rail than the intermediate connection point such that the first shroud loop is formed by first portions of the first and second rung cords extending between the first connection point and the intermediate connection point; and a second connection point is defined between the first and second rung cords at a location closer to second ladder rail than the intermediate connection point such that the second shroud loop is formed by second portions of the first and second rung cords extending between the second connection point and the intermediate connection point.

12. The ladder tape assembly of claim 8, wherein the first and second shroud loops extend transversely across a space defined directly between the first and second ladder rails.

13. The ladder tape assembly of claim 8, wherein each pair of shroud loops of the plurality of shroud loops forms a ladder step, wherein each ladder step extends transversely between the first and second ladder rails from a first end of each ladder step positioned at the first ladder rail to a second end of each ladder step positioned at the second ladder rail.

14. A ladder tape assembly for supporting slats of a slatted blind, the ladder tape assembly comprising:

a first vertically extending ladder rail;

a second vertically extending ladder rail spaced apart from the first ladder rail; and a plurality of pairs of shroud loops extending between the first and second ladder rails, each pair of shroud loops of the plurality of pairs of shroud loops including a first shroud loop and a second shroud loop disposed between the first and second ladder rails, each pair of shroud loops of the plurality of pairs of shroud loops supporting thereon a respective slat of a plurality of slats such that the respective slat is disposed on top of both the first shroud loop and the second shroud loop of a respective pair of shroud loops of the plurality of pairs of shroud loops;

a first lift cord extending vertically through the first shroud loop of each pair of shroud loops; and a second lift cord extending vertically through the second shroud loop of each pair of shroud loops;

wherein:

each pair of shroud loops includes a rung cord extending between the first and second ladder rails; and the first and second shroud loops are formed by first and second openings, respectively, defined in the rung cord between the first and second ladder rails, with the first and second openings being separated from each other via a bridge of the rung cord.

15. The ladder tape assembly of claim 14, wherein the bridge separates the first shroud loop from the second shroud loop such that the first lift cord is configured to be isolated from the second lift cord via the bridge of each ladder step.

* * * * *